(12) United States Patent
Bui et al.

(10) Patent No.: US 11,538,463 B2
(45) Date of Patent: Dec. 27, 2022

(54) CUSTOMIZABLE SPEECH RECOGNITION SYSTEM

(71) Applicant: ADOBE INC., San Jose, CA (US)

(72) Inventors: Trung Huu Bui, San Jose, CA (US); Subhadeep Dey, Martigny (CH); Franck Dernoncourt, Sunnyvale, CA (US)

(73) Assignee: Adobe Inc., San Jose, CA (US)

( * ) Notice: Subject to any disclaimer, the term of this patent is extended or adjusted under 35 U.S.C. 154(b) by 566 days.

(21) Appl. No.: 16/383,312

(22) Filed: Apr. 12, 2019

(65) Prior Publication Data

US 2020/0327884 A1    Oct. 15, 2020

(51) Int. Cl.
*G10L 15/16*    (2006.01)
*G06N 3/08*    (2006.01)
*G10L 15/07*    (2013.01)

(52) U.S. Cl.
CPC ............... *G10L 15/16* (2013.01); *G06N 3/08* (2013.01); *G10L 15/075* (2013.01)

(58) Field of Classification Search
USPC ............... 704/231, 232, 246, 247, 251, 252
See application file for complete search history.

(56) References Cited

U.S. PATENT DOCUMENTS 10,652,394 B2 *   5/2020   Van Os ............. H04M 3/53333
10,867,595 B2 *  12/2020   Sriram ................. G10L 15/183
2018/0144242 A1 *   5/2018   Simard ................... G06N 3/084
2019/0228298 A1 *   7/2019   Suzuki ..................... G06N 5/02
2020/0082269 A1 *   3/2020   Gao ...................... G06N 3/0454
2020/0312301 A1 *  10/2020   Polovets ................ G06N 3/084

OTHER PUBLICATIONS

Kingma, Diederik P., and Jimmy Ba. "Adam: A method for stochastic optimization." arXiv preprint arXiv: 1412.6980. (Year: 2014).*
Chorowski, Jan, et al. "Attention-based models for speech recognition." arXiv preprint arXiv: 1506.07503. (Year: 2015).*
Mikolov, Tomas, et al. "Rnnlm-recurrent neural network language modeling toolkit." Proc. of the 2011 ASRU Workshop. (Year: 2011).*
Mikolov, Tomas, et al. "Subword language modeling with neural networks." preprint (http://www. fit. vutbr. cz/imikolov/mnlm/char. pdf) 8: 67. (Year: 2012).*

* cited by examiner

*Primary Examiner* — Leonard Saint-Cyr
(74) *Attorney, Agent, or Firm* — Shook, Hardy & Bacon LLP

(57) ABSTRACT

Methods and systems are provided for generating a customized speech recognition neural network system comprised of an adapted automatic speech recognition neural network and an adapted language model neural network. The automatic speech recognition neural network is first trained in a generic domain and then adapted to a target domain. The language model neural network is first trained in a generic domain and then adapted to a target domain. Such a customized speech recognition neural network system can be used to understand input vocal commands.

20 Claims, 11 Drawing Sheets

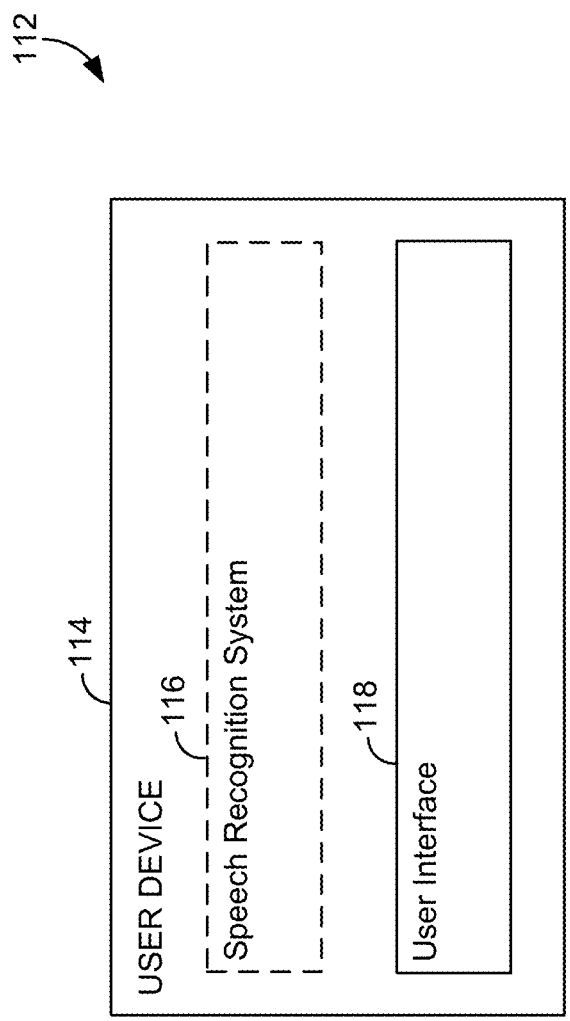

CUSTOMIZABLE SPEECH RECOGNITION SYSTEM

BACKGROUND

Oftentimes, it is desirable for computer programs (e.g., applications) to have verbal command-based functionality. A program capable of understanding and responding to verbal commands allows users to more easily interact with and use the program. Such verbal commands are often tied to particular features in the application. For instance, in an image editing application, a verbal command can be given to modify the saturation of an image. In this regard, speech recognition can be used as the basis for verbal command-based functionality. Speech recognition can be implemented by first using automatic speech recognition to process speech (e.g., one or more utterances) and the using a language model to understand and/or interpret the processed speech.

With regard to automatic speech recognition, conventional solutions implement several systems back-to-back to process speech. For instance, these systems use a pipeline approach having a large number of systems or components placed back-to-back to produce an output. In particular, traditional speech recognition solutions typically use a trained acoustic model as the back-to-back automatic speech recognition solution along with a language model (e.g., a decoding graph) used to interpret output(s) from the acoustic model. The acoustic model can be created for sub-phonetic units associated with speech. Sub-phonetic units represent information smaller than a phonetic unit (e.g., a recognizable speech sound) that are not audible or recognizable to the human ear. These sub-phonetic units can be represented using Hidden Markov Models. The decoding graph can then be used to interpret these sub-phonetic units to produce a text transcript.

However, such conventional back-to-back automatic speech recognition solutions are limited. For instance, adapting such solutions for a new domain raises many challenges. These challenges include the need to individually adapt most of the systems or components to make the automatic speech recognition solutions work well in the domain.

Automatic speech recognition solutions that implement an end-to-end approach have attempted to overcome the challenges faced by back-to-back solutions. End-to-end approaches use a trained automatic speech recognition model based on a direct sequence-to-sequence mapping approach (e.g., mapping acoustic features to text-transcripts). In this solution, a trained automatic speech recognition model can be optimized using output characters rather than sub-phonetic units. The end-to-end system can then be applied to predict a sequence of words from the output characters using an external language model. However, such a traditional end-to-end system requires an extensive dataset for training an accurate automatic speech recognition model. As such, end-to-end systems using such a conventional approach cannot be satisfactorily trained for customized systems.

SUMMARY

Embodiments of the present disclosure are directed to a customizable speech recognition system capable of recognizing speech related to a specific domain. One method described herein for creating such a system is using a neural network(s). A neural network can initially be trained to perform automatic speech recognition. The neural network can further undergo domain adaptation to customize the network for a specific target domain. In particular, a customizable speech recognition neural network system can be trained for a generic domain and then adapted to a target domain of interest. This is advantageous because the customizable speech recognition system takes advantage of the large dataset of the generic domain to initially train the system for speech recognition and then uses the small custom dataset of the target domain to augment the system for speech recognition in a target domain.

BRIEF DESCRIPTION OF THE DRAWINGS

FIG. 1B depicts an example configuration of an operating environment in which some implementations of the present disclosure can be employed, in accordance with various embodiments.

DETAILED DESCRIPTION

Figure 1A:
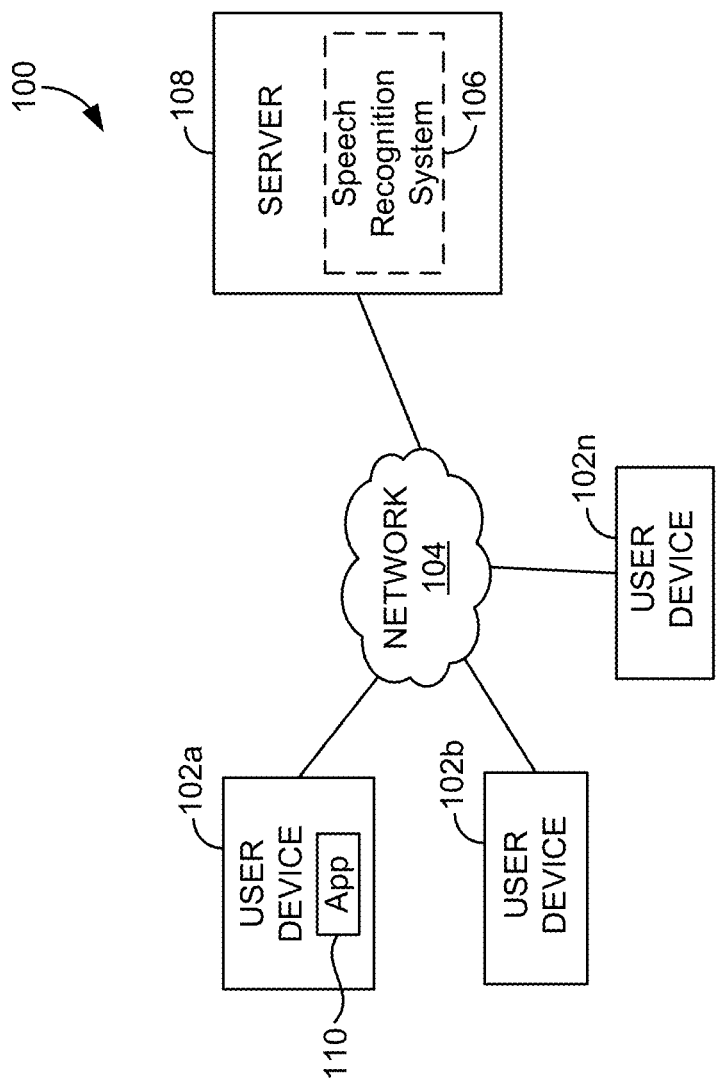
FIG. 1A depicts an example configuration of an operating environment in which some implementations of the present disclosure can be employed, in accordance with various embodiments.

The subject matter of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

When adding speech recognition functionality to an application, it is desirable that the speech recognition in the application is tailored to the functionality of the application. When applications are highly specific, words related to speech recognition might not be as common outside the realm of the application. For instance, in image editing applications, speech recognition should understand words like "saturation," "tone," "coloration," etc.

Conventional speech recognition systems are typically based on automatic speech recognition using either back-to-back or end-to-end solutions along with a language model. Traditional back-to-back solutions are limited in success for creating speech recognition solutions customized for a specific domain. Such solutions are comprised of a pipeline of a large number of systems and/or components. When customizing back-to-back solutions for a particular domain (e.g., application), many of the systems and/or components need be individually updated to accurately perform in the domain. To reduce the amount of manual time and effort spent updating the systems and/or components of a back-to-back solution, techniques have been developed using end-to-end solutions.

Yet, traditional end-to-end solutions are also limited for creating speech recognition systems customized for a specific domain. In particular, these end-to-end solutions require an extensive dataset to train an accurate system. Training a speech recognition system in a large, but unrelated domain, can result in a speech recognition system lacking accuracy for the domain of the application. For instance, a speech recognition system trained using a large unrelated dataset can result in a speech recognition system that fails to understand words, phrases, terms, etc. related to the domain of the application. However, a large dataset is often not available for many domains (e.g., specific to the content of an application). While end-to-end solutions can be trained for a domain having a small dataset, training using such a small dataset often results in a speech recognition system lacking accuracy. For instance, a speech recognition system trained using a small dataset can result in a speech recognition system that has not been trained until error is minimized below a predefined threshold (e.g., because there is not enough data). Further, if the speech recognition system is trained to minimize error below a predefined threshold, a small dataset can result in the system being over-fitted to that dataset.

Accordingly, embodiments of the present disclosure are directed to facilitating the creation of a customizable speech recognition system capable of accurately recognizing speech related to a specific domain. Advantageously, adapting a speech recognition system to a specific domain ensures that the system understands words, phrases, terms, etc. related to the domain.

At a high-level, the customizable speech recognition system takes advantage of a large dataset to initially train the system for speech recognition and then a small customized dataset to augment the system for speech recognition in a target domain. In particular, the customizable speech recognition system can be implemented using a neural network system comprised of one or more neural networks. A neural network generally refers to a computational approach using large clusters of connected neurons. Neural networks are self-learning and trained rather than explicitly programmed so that a generated output reflects a desired result. As described herein, a customizable speech recognition neural network system can utilize an automatic speech recognition neural network along with a language model neural network. Such a speech recognition system can apply the automatic speech recognition neural network to predict an output from input vocal utterances.

The automatic speech recognition neural network can be trained to predict an output from input vocal utterances. In embodiments, the predicted output can be characters or byte-pairs. Characters can be the 26 English characters (e.g., a, b, . . . , z). Byte-pairs represent larger grouping of characters (e.g., "elephant" can be comprised of the byte-pairs: ele-ph-ant).

To train the automatic speech recognition neural network, an encoder-decoder architecture can be employed. Such an architecture can include an encoder, an attention unit, and a decoder. The encoder can be used to learn feature representations that capture correlations between sub-phonetic units and the output of the system. The attention unit can be used to estimate the relative importance of each feature in determining the correct output. The decoder can be used to construct an output using learned representations.

The automatic speech recognition neural network can first be trained using a generic dataset. The generic dataset can be a large speech-based dataset. Such a large dataset contains enough data to train the neural network to be highly accurate for the generic domain and avoid any over-fitting. Training of the automatic speech recognition neural network using the generic dataset can continue until the network converges to a state where the output reaches a desired threshold level of accuracy.

The automatic speech recognition neural network can then undergo adaptation to customize the network for a target domain. The target dataset often is a small speech-based dataset. Adapting the automatic speech recognition model maintains the high accuracy of predicting characters from input audio learned from the generic domain while tailoring the model for the specific target domain of interest (e.g., application, program, etc.). In this way, adaptation ensures that the model understands words, phrases, terms, etc. related to the target domain. Adaptation of the automatic speech recognition neural network can utilize freezing layers of the network during adaptation, appending the network with additional layers to train the network to incorporate word loss, and aligning feature vectors with network outputs.

First, freezing layers of the automatic speech recognition neural network results in updating only unfrozen layer(s) parameters/weights during adaptation. For instance, freezing the encoder can result in the weights of the attention unit and decoder being updated during adaptation of the network. Freezing the encoder can be advantageous because the frozen encoder parameters/weights can maintain the information that the neural network learned from the large generic dataset about encoding hidden representations from input feature vectors. This information can ensure features are maintained that help in predicting desired outputs. Freezing the decoder can be advantageous because the frozen decoder parameters/weights can maintain the information that the neural network learned from the large generic dataset about constructing an output from learned representations. This can ensure that predicted output leverages information for accurately using a previous output to infer the current output.

Next, word loss can be used to adapt the automatic speech recognition neural network. Incorporating word loss during adaptation of the network results in encoder producing hidden representations that include information useful for not only predicting an accurate output based on characters but also based on predicted words. Additional layers can be added to the network for adapting the network to learn word loss. When the modified automatic speech recognition neural network reaches a desired level of accuracy, the additional layers related to word loss can be removed from the network. With the additional layers removed, the network still maintains the information learned from incorporating word loss. However, by removing these layers, the final network outputs characters. This is advantageous because the network is not limited to predicting trained words (e.g., the network predicts characters that can comprise words that have not been previously encountered).

Finally, attention weights can be aligned in the automatic speech recognition neural network to prevent erroneous attention weights from being included in a context vector generated by the attention unit. Aligning the attention weights can utilize the information learned during the initial training while ensuring that outputs predicted in a customized system are focused on the correct hidden representations when generating a context vector. This increases the accuracy by the decoder.

Upon completion of adapting the automatic speech recognition neural network to the target domain using freezing, word loss, and/or aligning attention weights, the automatic speech recognition neural network can be used to process vocal utterances. In particular, the automatic speech recognition neural network can generate a vector that indicates the predicted output. Such a vector can indicate a character or a byte-pair that corresponds to a timeframe of the input vocal utterance.

The speech recognition system can then use a language model neural network to process the predicted outputs from the automatic speech recognition neural network to determine the likelihood of occurrence of a word from the predicted output. The language model neural network predicts a next item given previous items in a sequence (e.g., where items can be characters, words, or byte-pairs). For instance, the language model neural network can receive as input the output produced by the automatic speech recognition neural network (e.g., characters or byte-pairs).

The language model neural network can be initially trained using the generic dataset and further adapted using the target dataset. The language model neural network can correspond with a type of output from the automatic speech recognition neural network (e.g., language models for an automatic speech recognition neural network predicting a character can be trained to predict next characters or word, language models for an automatic speech recognition neural network predicting a byte-pair can be trained to predict next byte-pairs). In this way, the language model can perform decoding of the automatic speech recognition neural network output to determine the predicted speech from the input utterance.

FIG. 1A depicts an example configuration of an operating environment in which some implementations of the present disclosure can be employed, in accordance with various embodiments. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 10.

It should be understood that operating environment 100 shown in FIG. 1A is an example of one suitable operating environment. Among other components not shown, operating environment 100 includes a number of user devices, such as user devices 102a and 102b through 102n, network 104, and server(s) 108. Each of the components shown in FIG. 1A may be implemented via any type of computing device, such as one or more of computing device 1000 described in connection to FIG. 10, for example. These components may communicate with each other via network 104, which may be wired, wireless, or both. Network 104 can include multiple networks, or a network of networks, but is shown in simple form so as not to obscure aspects of the present disclosure. By way of example, network 104 can include one or more wide area networks (WANs), one or more local area networks (LANs), one or more public networks such as the Internet, and/or one or more private networks. Where network 104 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 104 is not described in significant detail.

It should be understood that any number of user devices, servers, and other components may be employed within operating environment 100 within the scope of the present disclosure. Each may comprise a single device or multiple devices cooperating in a distributed environment.

User devices 102a through 102n can be any type of computing device capable of being operated by a user. For example, in some implementations, user devices 102a through 102n are the type of computing device described in relation to FIG. 10. By way of example and not limitation, a user device may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user devices can include one or more processors, and one or more computer-readable media. The computer-readable media may include computer-readable instructions executable by the one or more processors. The instructions may be embodied by one or more applications, such as application 110 shown in FIG. 1A. Application 110 is referred to as a single application for simplicity, but its functionality can be embodied by one or more applications in practice. As indicated above, the other user devices can include one or more applications similar to application 110.

The application(s) 110 may generally be any application capable of facilitating the exchange of information between the user devices and the server(s) 108 in carrying out customized speech recognition. In some implementations, the application(s) comprises a web application, which can run in a web browser, and could be hosted at least partially on the server-side of environment 100. In addition, or instead, the application(s) can comprise a dedicated application, such as an application having customized speech recognition functionality. In some cases, the application is integrated into the operating system (e.g., as a service). It is therefore contemplated herein that "application" be interpreted broadly. For instance, the application(s) can be related to image editing, text editing, any other type of editing and/or interactive program, etc.

In accordance with embodiments herein, the application 110 can facilitate customized speech recognition. In some cases, a user can utter a vocal command. Such a vocal command can be input in any manner. For example, a user may speak a desired vocal command. Based on the input vocal command, (e.g., provided via a user device), customized speech recognition can be performed. When an utterance is recognized, a particular result can occur. The result can be implemented, for example in the application. For instance, if the vocal command is "crop image" a cropping feature can be presented (e.g., using a user interface).

As described herein, server 108 can facilitate customized speech recognition via speech recognition system 106. Server 108 includes one or more processors, and one or more computer-readable media. The computer-readable media includes computer-readable instructions executable by the one or more processors. The instructions may optionally implement one or more components of speech recognition system 106, described in additional detail below.

Speech recognition system 106 can train and operate a neural network system in order to perform customized speech recognition. Such a neural network system can be comprised of one or more neural networks trained to generate a designated output. For example, a neural network system can utilize an encoder-decoder framework. The customizable speech recognition system is discussed in further detail with reference to FIG. 2.

In implementations (e.g., cloud-based implementations), the instructions on server 108 may implement one or more components of speech recognition system 106, and application 110 may be utilized by a user to interface with the functionality implemented on server(s) 108. In some cases, application 110 comprises a web browser. In other cases, server 108 may not be required. For example, the components of speech recognition system 106 may be implemented completely on a user device, such as user device 102a. In this case, speech recognition system 106 may be embodied at least partially by the instructions corresponding to application 110.

Thus, it should be appreciated that speech recognition system 106 may be provided via multiple devices arranged in a distributed environment that collectively provide the functionality described herein. Additionally, other components not shown may also be included within the distributed environment. In addition, or instead, speech recognition system 106 can be integrated, at least partially, into a user device, such as user device 102a. Furthermore, speech recognition system 106 may at least partially be embodied as a cloud computing service.

Referring to FIG. 1B, aspects of an illustrative speech recognition system is shown, in accordance with various embodiments of the present disclosure. FIG. 1B depicts a user device 114, in accordance with an example embodiment, configured to allow for customized speech recognition. The user device 114 may be the same or similar to the user device 102a-102n and may be configured to support the speech recognition system 116 (as a standalone or networked device). For example, the user device 114 may store and execute software/instructions to facilitate interactions between a user and the speech recognition system 116 via the user interface 118 of the user device.

A user device can be utilized by a user to facilitate customized speech recognition. In particular, a user can input a vocal command into speech recognition system 116. The processed result of recognizing that vocal command can be presented utilizing user interface 118. A vocal command can be input in any manner. The user interface may facilitate the user interacting with features of an application (e.g., using vocal commands). Based on a vocal command, speech recognition system 116 can be used to interact with an application using various techniques, some of which are further discussed below. User device 114 can also be utilized for displaying result of vocal commands.

Figure 2:
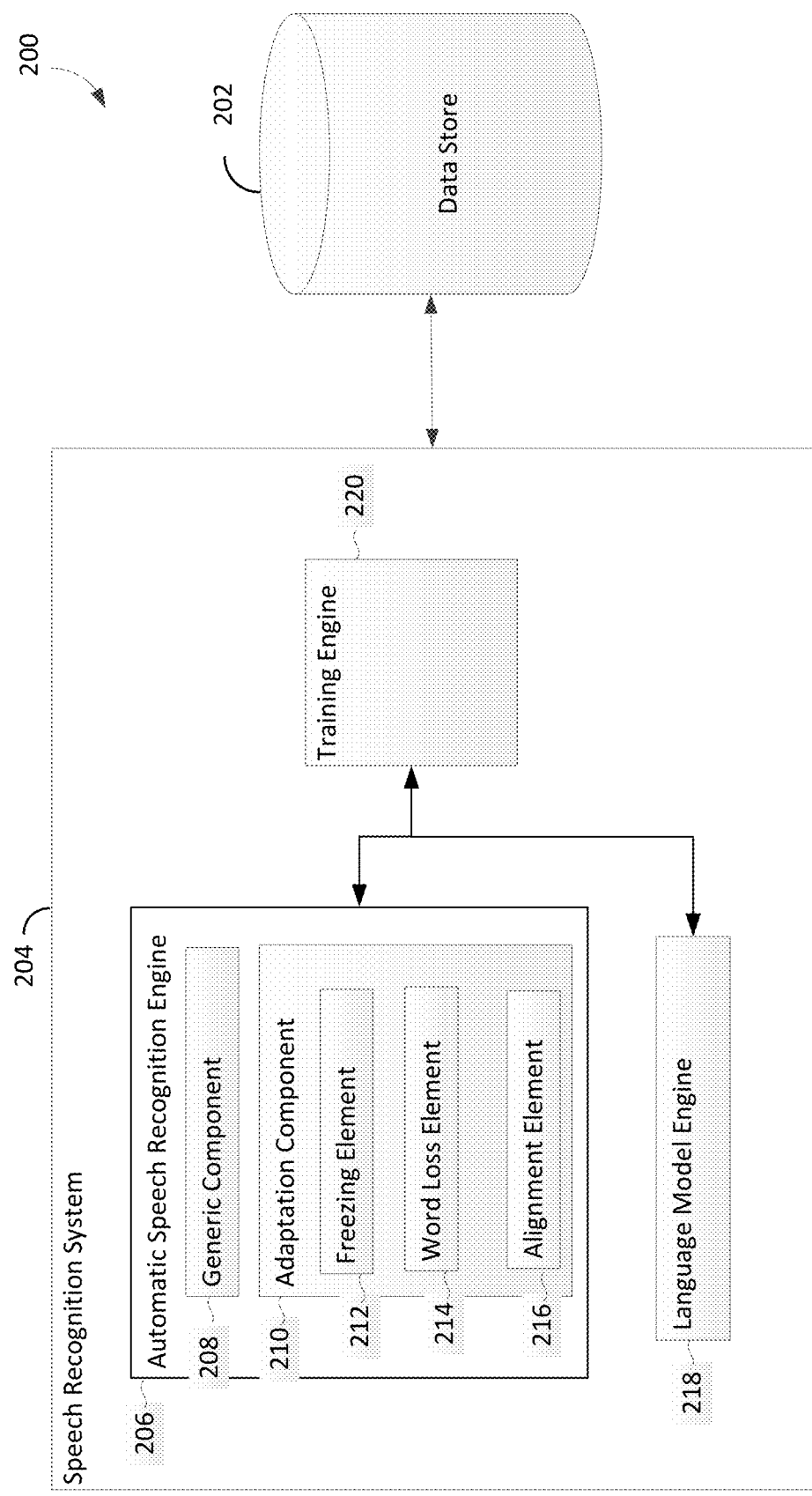
FIG. 2 depicts an example configuration of an operating environment in which some implementations of the present disclosure can be employed, in accordance with various embodiments of the present disclosure.

Referring to FIG. 2, aspects of an illustrative speech recognition environment 200 are shown, in accordance with various embodiments of the present disclosure. Speech recognition system 204 includes automatic speech recognition engine 206, language model engine 218, and training engine 220. The foregoing engines of speech recognition system 204 can be implemented, for example, in operating environment 100 of FIG. 1A and/or operating environment 112 of FIG. 1B. In particular, those engines may be integrated into any suitable combination of user devices 102a and 102b through 102n and server(s) 106 and/or user device 114. While the various engines are depicted as separate engines, it should be appreciated that a single engine can perform the functionality of all engines. Additionally, in implementations, the functionality of the engines can be performed using additional engines and/or components. Further, it should be appreciated that the functionality of the engines can be provided by a system separate from the speech recognition system.

As shown, a speech recognition system can operate in conjunction with data store 202. Data store 202 can store computer instructions (e.g., software program instructions, routines, or services), data, and/or models used in embodiments described herein. In some implementations, data store 202 can store information or data received via the various engines and/or components of speech recognition system 204 and provide the engines and/or components with access to that information or data, as needed. Although depicted as a single component, data store 202 may be embodied as one or more data stores. Further, the information in data store 202 may be distributed in any suitable manner across one or more data stores for storage (which may be hosted externally).

In embodiments, data stored in data store 202 can include training data. Training data generally refers to data used to train a neural network system, or portion thereof. As such, training data can include one or more datasets (e.g., a generic dataset and a target dataset). A generic dataset can be a generic speech-based dataset (e.g., LibriSpeech). In embodiments, the generic dataset can be a corpus of read English speech, suitable for training and/or evaluating speech recognition systems. Such generic dataset can be derived, for example, from audiobooks audio recordings of newspapers, transcripts from newscasts, etc. A target dataset can be a targeted speech-based dataset custom to a particular domain (e.g., application, program, etc.).

Such dataset can be used for training and/or adapting a neural network system (e.g., customizable speech recognition neural network system). The datasets can be input into data store 202 from a remote device, such as from a server or a user device. These datasets can be stored in a raw form and/or in a processed form. Processing a dataset can result in extracting feature vectors. Feature vectors can be represented as a fixed dimension vector. A timeframe of audio can be represented using a number of fixed dimension vectors.

Data store 202 can also be used to store a neural network system during training and/or upon completion of training. Such a neural network system can be comprised of one or more neural networks and/or neural network systems. For example, the neural network system can include an automatic speech recognition neural network and a language model neural network.

Speech recognition system 204 can generally be used for speech recognition in a specific domain. In accordance with embodiments described herein, the speech recognition system can be run using, for example, a customizable speech recognition neural network system. Specifically, the speech recognition system can be used to train a customized speech recognition neural network system and/or implement a trained customized speech recognition neural network system. Such a customizable speech recognition neural network system can be comprised of an automatic speech recognition model and a language model. Automatic speech recognition engine 206 can be used to train and/or implement an automatic speech recognition model. Language model engine 218 can be used to train and/or implement a language model. In embodiments, during training, automatic speech recognition engine 206 and language model engine 208 can operate in conjunction with training engine 220 to train the customized speech recognition neural network system.

Automatic speech recognition engine 206 can be used to implement the automatic speech recognition neural network of the customizable speech recognition neural network system. Automatic speech recognition engine 206 can include generic component 208 and adaptation component 210. The foregoing components of automatic speech recognition engine 208 can be implemented, for example, in operating environment 100 of FIG. 1A and/or operating environment 112 of FIG. 1B. In particular, these components may be integrated into any suitable combination of user devices 102a and 102b through 102n and server(s) 106 and/or user device 114. While the various components are depicted as separate components, it should be appreciated that a single component can perform the functionality of all components. Additionally, in implementations, the functionality of the components can be performed using additional components and/or engines. Further, it should be appreciated that the functionality of the components can be provided by an engine separate from the automatic speech recognition engine.

The automatic speech recognition neural network can comprise a plurality of interconnected nodes with a parameter, or weight, associated with each node. Each node can receive inputs from multiple other nodes and can activate based on the combination of all these inputs, for example, when the sum of the input signals is above a threshold. The parameter can amplify or dampen the input signals. For example, a parameter could be a value between 0 and 1. The inputs from each node can be weighted by a parameter, or in other words, multiplied by the parameter, prior to being summed. In this way, the parameters can control the strength of the connection between each node and the subsequent node. For example, for a given node, a first parameter can provide more weight to an input from a first node, while a second parameter can provide less weight to an input from a second node. As a result, the parameters strengthen the connection to the first node, making it more likely that a signal from the first node will cause the given node to activate, while it becomes less likely that inputs from the second node will cause activation. These parameters can be determined during training of the automatic speech recognition neural network, as discussed below (e.g., with reference to generic component 208). In addition, some, or all of these, parameters can be updated during adaptation of the automatic speech recognition neural network, as discussed below (e.g., with reference to adaptation component 210)

In an embodiment, the automatic speech recognition neural network (e.g., implemented using automatic speech recognition engine) can use an encoder-decoder architecture. In particular, the neural network can have an encoder, an attention unit, and a decoder. The encoder can be used to learn feature representations that capture the correlation between sub-phonetic units and the output of the system. The attention unit can be used to estimate the relative importance of each feature in determining the correct output. The decoder can be used to construct this output using learned representations.

Generic component 208 can be used to initially train the automatic speech recognition neural network. In particular, the generic component can utilize a generic dataset to initially train the neural network. The generic dataset can be a large speech-based dataset unrelated to any particular domain (e.g., LibriSpeech). Such a large dataset contains enough data to train the neural network to be highly accurate for a generic domain and avoid any over-fitting.

The generic component can receive data. The data received by the generic component can include a timeframe of audio recording from a generic dataset. In one instance, the timeframe can be a one-microsecond window of audio. Upon receiving the data, the data can be analyzed to extract feature vectors. In some embodiments, the data can undergo pre-processing to extract the feature vectors and then be stored (e.g., in data store 202). In this way, data can be an unprocessed audio recording and/or a pre-processed audio recording. Feature vectors extracted from a timeframe of the audio recording can be represented as a fixed dimension vector. In this way, a timeframe of audio can be represented using a number of fixed dimension vectors (e.g., one-second timeframe of audio can have around 1,000 fixed dimension vectors). Such vectors can be represented using mel-frequency cepstral coefficients ("MFCCs). MFCCs can be a representation of speech samples based on frequency. For instance, MFCCs can be derived from a type of cepstral representation of an audio clip such that the frequency bands are equally spaced on the mel scale (e.g. approximating the human auditory system's response more).

In a first embodiment, the automatic speech recognition neural network can be trained to predict characters from input audio. Such characters can be the 26 English characters (e.g., a, b, . . . , z). The fixed dimension vector having feature vectors indicative of a timeframe of the audio recording (e.g., representing an utterance) can be input into the encoder of the automatic speech recognition neural network. For instance utterance, X, can be represented as $\{x_i, x_2, \ldots, x_T\}$. The encoder can process this fixed dimension vector to produce a sequence of hidden representations corresponding to the utterance. The hidden representation vector can be comprised of a sequence of vectors. For instance, the hidden representation, h, can be represented by $\{h_1, h_2, \ldots, h_L\}$. This hidden representation output by the encoder can be a constant. In embodiments, the encoder can be comprised of bi-directional long short-term memory layers ("BLSTM") (e.g., five layers). BLSTM layers can learn bidirectional long-term dependencies sequences of data.

The attention unit can receive the hidden representation vector from the encoder. In some embodiments, the attention unit can be used to align the neural network in such a way that given a sequence of audio, the network can identify where a character starts and ends. Upon determining where characters begin/end, the attention unit can determine a context vector. In embodiments, the attention unit can also estimate the relative importance of each feature vector from the input sequence of hidden representations in predicting the output of the network. The attention unit can generate a context vector that represents the importance of the hidden representations. The context vector, $c_i$, can be computed for the $i^{th}$ output unit. For instance, given hidden representation h is represented by $\{h_1, h_2, \ldots, h_L\}$, the attention unit attempts to determine from $h_1$ to $h_L$ which hidden representation(s) is responsible for producing the final output character (e.g., by the decoder).

This context vector output by the attention unit can be received by the decoder of the automatic speech recognition neural network. The decoder can use the context vector to predict a character unit. The character unit can represent which of the 26 English characters is predicted from the context vector. For instance, the character unit can be a 26-dimension vector representing the likelihood that the context vector corresponds to a particular character (e.g., 98 percent likelihood that the character is "a"). The decoder can also use previously decoded character units in predicting the current character unit.

The decoder can be comprised of BLSTM layers (e.g., two layers). The decoder can also have a softmax function. The softmax function can normalize a vector into a probability distribution having a total sum equal to one. In this way, the softmax function can normalize the representation of each of the 26 English characters in the character unit. This normalized representation can be used to predict a character (e.g., based on which unit from the character unit has the highest value). For instance, if the tenth unit is the highest, the predicted character is "j". The output from the decoder can be represented as $y_i$.

During the initial training of the automatic speech recognition neural network, the network can be updated for error. During initial training, error in the network can be determined using, for example, cross-entropy loss. Error can be determined based on differences between the output from the network and a ground truth output. The ground truth output is a known output corresponding to an input such that if the neural network is trained perfectly, the output from the network will be the same as the ground truth. Such errors can then be fed back through the automatic speech recognition neural network to appropriately train the neural network, for instance, by adjusting the weight of the network connections to reduce the value of the errors.

This training can be performed using, for example, training engine 220 in conjunction with the components of automatic speech recognition engine 208. This process can be repeated for a sufficiently large number of training cycles, until the automatic speech recognition neural network system converges to a state where the output reaches a desired threshold level of accuracy. Such accuracy can be determined using a test set of data from the generic dataset. The test set of data can be a timeframe of audio recording from the generic dataset that was not used during training of the automatic speech recognition neural network (e.g., brand new data that still has a known ground truth that can be used to determine accuracy of the network).

In a further embodiment, the automatic speech recognition neural network can be trained to predict byte-pairs from input audio. Byte-pair encoding can be used to represent larger grouping of characters. For instance, "elephant" can be comprised of the byte-pairs: ele-ph-ant. Byte-pairs can be automatically derived based on frequency of usage. Byte-pair encoding can be advantageous because the byte-pairs can correlate closely to sub-phonetic units from speech utterances. Character-based outputs often do not correspond to the basic sounds produced during speech. Byte-pairs can include a set of the most common groupings of text (e.g., 5,000 byte-pairs).

The fixed dimension vector having feature vectors indicative of a timeframe of the audio recording (e.g., representing an utterance) can be input into the encoder of the automatic speech recognition neural network. For instance, utterance, X, can be represented as $\{x_i, x_2, \ldots, x_T\}$. The encoder can process this fixed dimension vector to produce a sequence of hidden representations corresponding to the utterance. The hidden representation vector can be comprised of a sequence of vectors. For instance, the hidden representation, h, can be represented by $\{h_1, h_2, \ldots, h_L\}$. This hidden representation output by the encoder can be a constant. In embodiments, the encoder can be comprised BLSTM layers (e.g., five layers) to learn bidirectional long-term dependencies sequences of data.

The attention unit can receive the hidden representation from the encoder. The attention unit aligns the neural network in such a way that given a sequence of audio, the network can identify where a byte-pair starts and ends. Upon determining where byte-pairs begin/end, the attention unit can determine a context vector.

The attention unit can receive the hidden representation vector from the encoder. In some embodiments, the attention unit can be used to align the neural network in such a way that given a sequence of audio, the network can identify where a byte-pair starts and ends. Upon determining where byte-pairs begin/end, the attention unit can determine a context vector. In embodiments, the attention unit can also estimate the relative importance of each feature vector from the input sequence of hidden representations for predicting the output of the network. The attention unit can generate a context vector that represents the importance of the hidden representations. The context vector, $c_i$, can be computed for the $i^{th}$ output unit. For instance, given hidden representation h is represented by $\{h_1, h_2, \ldots, h_L\}$, the attention unit attempts to determine from $h_1$ to $h_L$ which hidden representation(s) is responsible for producing the final output byte-pair (e.g., by the decoder).

This context vector output by the attention unit can be received by the decoder of the automatic speech recognition neural network. The decoder can use the context vector to predict a byte-pair unit. The byte-pair unit can represent which of the set of byte-pairs is predicted from the context vector. For instance, the byte-pair unit can be a 5,000-dimension vector representing the likelihood that the context vector corresponds to a particular byte-pair (e.g., 70 percent likelihood that the byte-pair is "ph"). The decoder can also use previously decoded output byte-pairs in predicting the current byte-pair unit.

The decoder can be comprised of BLSTM layers (e.g., two layers). The decoder can also have a softmax function. The decoder can also have a softmax function. The softmax function can normalize a vector into a probability distribution having a total sum equal to one. In this way, the softmax function can normalize the representation of each of the byte-pairs in the byte-pair unit. This normalized representation can be used to predict a byte-pair (e.g., based on which unit from the byte-pair unit has the highest value).

During the initial training of the automatic speech recognition neural network, the network can be updated for error.

During initial training, error in the network can be determined using, for example, cross-entropy loss. In particular, cross-entropy loss can be an output with a probability value between 0 and 1. Cross-entropy loss increases as the predicted probability diverges from the actual output (e.g., ground truth output). A perfect model would have a loss of 0. Error can be determined based on differences between the output from the network and a ground truth output. The ground truth output is a known output corresponding to an input such that if the neural network is trained perfectly, the output from the network will be the same as the ground truth. Such errors can then be fed back through the automatic speech recognition neural network to appropriately train the neural network, for instance, by adjusting the weight of the network connections to reduce the value of the errors. For instance, in one embodiment, the output character unit can be compared with a ground truth character unit to determine errors. In another embodiment, the output byte-pair unit can be compared with a ground truth character unit to determine errors. Such errors can then be fed back through the automatic speech recognition neural network to appropriately train the neural network, for instance, by adjusting the weight of the network connections to reduce the value of the errors.

This initial training can be performed using, for example, training engine 220 in conjunction with the components of automatic speech recognition engine 208. This process can be repeated for a sufficiently large number of training cycles, until the automatic speech recognition neural network system converges to a state where the output reaches a desired threshold level of accuracy for the generic domain. Such accuracy can be determined using a test set of data from the generic dataset. The test set of data can be a timeframe of audio recording from the generic dataset that was not used during training of the automatic speech recognition neural network (e.g., brand new data that still has a known ground truth that can be used to determine accuracy of the network).

Upon reaching a desired threshold of accuracy in the generic domain, the automatic speech recognition neural network can undergo domain adaptation. Adapting the neural network updates the automatic speech recognition neural network trained in the generic domain and modifies the parameters/weights of the automatic speech recognition neural network for the target domain. Advantageously, adapting an automatic speech recognition neural network takes advantage of using a large generic dataset to obtain a neural network that is highly accurate at predicting characters or byte-pairs from input audio. This highly accurate neural network can then be tailored to the specific target domain of interest to ensure that the network understands words, phrases, terms, etc. related to the target domain.

Adaptation component 210 can be used to adapt the automatic speech recognition neural network. Adaptation component 210 can include freezing element 212, word loss element 214, and alignment element 216. The foregoing elements of adaptation component 210 can be implemented, for example, in operating environment 100 of FIG. 1A and/or operating environment 112 of FIG. 1B. In particular, these elements may be integrated into any suitable combination of user devices 102a and 102b through 102n and server(s) 106 and/or user device 114. While the various elements are depicted as separate elements, it should be appreciated that a single element can perform the functionality of all elements. Additionally, in implementations, the functionality of the elements can be performed using additional components, engines and/or elements. Further, it should be appreciated that the functionality of the elements can be provided by a component separate from the adaptation component.

Adaptation component 210 can be used to adapt the automatic speech recognition neural network. In particular, the adaptation component can adapt the layers of the neural network to the target domain. The adaptation component can utilize a target domain dataset to customize the neural network. The target dataset often is a small speech-based dataset. Such a small dataset often does not contain enough data on its own to train a neural network to be highly accurate for the target domain and/or avoid over-fitting of the network.

The adaptation component 210 can receive data. The data received by the adaptation component can include a timeframe of audio recording from a target dataset. Upon receiving the data, the data can be analyzed to extract feature vectors. In some embodiments, the data can undergo pre-processing to extract the feature vectors and then be stored (e.g., in data store 202). In this way, data can be an unprocessed audio recording and/or a pre-processed audio recording. Feature vectors can be represented as a fixed dimension vector. A timeframe of audio can be represented using a number of fixed dimension vectors. These fixed dimension vector can be input into the automatic speech recognition neural network.

Freezing element 216 can be applied to the automatic speech recognition neural network. In an embodiment, the automatic speech recognition neural network can be implemented using an encoder-decoder architecture comprised of an encoder, an attention unit, and a decoder. The freezing element can be used to freeze the parameters/weights of the encoder and/or decoder of the automatic speech recognition neural network. By freezing layers of the network, only parameters/weights of the unfrozen layer(s) are updated during adaptation. In an embodiment, the encoder can be frozen. Freezing the encoder results in the weights of the attention unit and decoder being updated during adaptation of the network. Freezing the encoder can be advantageous because the frozen encoder parameters can maintain the information that the neural network learned about encoding hidden representations from input feature vectors that will help predict the desired output. In one embodiment, these frozen parameters can maintain features encoded in the hidden representations that will result in an accurate character being predicted. In another embodiment, these frozen parameters can maintain features encoded in the hidden representations that will result in an accurate byte-pair being predicted.

In embodiments where the automatic speech recognition neural network is initially trained to predict characters (e.g., using the generic domain for training), the network can be adapted to the target domain to more accurately predict characters as related to the target domain. The encoder of the automatic speech recognition neural network can receive an utterance as a fixed dimension vector. The encoder can process this fixed dimension vector to produce a sequence of hidden representations corresponding to the audio recording utterance. The attention unit can then receive the hidden representation from the encoder. The attention unit can estimate the relative importance of each feature vector and determine where characters begin/end to generate a context vector. The decoder can receive this context vector output. The decoder can use the context vector along with previously decoded output characters to predict a character unit.

In embodiments where the automatic speech recognition neural network is trained to predict byte-pairs (e.g., using the generic domain for training), the network can be adapted to the target domain to more accurately predict byte-pairs as related to the target domain. The encoder of the automatic speech recognition neural network can receive an utterance as a fixed dimension vector. The encoder can process this fixed dimension vector to produce a sequence of hidden representations corresponding to the audio recording utterance. The attention unit can then receive the hidden representation from the encoder. The attention unit can estimate the relative importance of each feature vector and determine where byte-pairs begin/end to generate a context vector. This context vector output can be received by the decoder. The decoder can use the context vector along with previously decoded output byte-pairs to predict a byte-pair unit.

During the adaptation of the automatic speech recognition neural network, the network can be updated for error. In particular, the unfrozen layers can be updated while the frozen layers remain the same. This adaptation can be performed using, for example, training engine 220 in conjunction with the components of automatic speech recognition engine 206.

For example, cross-entropy loss can be used to determine differences between the output from the network and a ground truth output. The ground truth output is a known output corresponding to an input such that if the neural network is perfectly trained, the output from the network will be the same as the ground truth. For instance, in one embodiment, the output character unit from the adapted network can be compared with a ground truth character unit to determine errors. In another embodiment, the output byte-pair unit from the adapted network can be compared with a ground truth character unit to determine errors. Such errors are then fed back through the automatic speech recognition neural network to appropriately update the neural network, for instance, by adjusting the weight of the unfrozen parameters of the network connections to reduce the value of the errors.

This process can be repeated for a sufficiently large number of training cycles, until the automatic speech recognition neural network system converges to a state where the output reaches a desired threshold level of accuracy for the target domain. Such accuracy can be determined using a test set of data from the target dataset. The test set of data can be a timeframe of audio recording from the target dataset that was not used during training of the automatic speech recognition neural network (e.g., brand new data that still has a known ground truth that can be used to determine accuracy of the network).

Word loss element 214 can also be applied to embodiments of the automatic speech recognition neural network (e.g., based on an encoder-decoder architecture as discussed previously). Word loss can be used to adapt a network trained for outputting characters. The word loss element can be used to incorporate word knowledge into the automatic speech recognition neural network. Incorporating word loss during adaptation of the neural network results in the encoder producing hidden representations that include information useful for not only predicting an accurate output based on characters but also based on predicted words.

In an embodiment, the architecture of the automatic speech recognition neural network can be modified during adaptation to incorporate word information by using a multi-task learning approach. For instance, two new layers can be appended into the network after training using the generic data set to output characters (e.g., using character units). These two layers can be an additional attention unit and decoder. In this way, a single encoder can be used to receive an utterance as a fixed dimension vector. The encoder can process this fixed dimension vector to produce a sequence of hidden representations corresponding to the utterance. The hidden representations can then be received by two different attention units (e.g., a character attention unit and a word attention unit), one linked to a decoder for outputting characters (e.g., a character decoder) and the other linked to a decoder for outputting words (e.g., a word decoder). In this way, the encoder, the character attention unit, and the character decoder can be previously trained using the generic dataset as discussed above (e.g., using generic component 208). The word attention unit and the word decoder can be added to the automatic speech recognition neural network for adapting the network using the target dataset.

When undergoing adaptation using this modified framework, the character attention unit can receive the hidden representation from the encoder and align the neural network in such a way that given a sequence of audio (e.g., an utterance), the network can identify where a character starts and ends. The character attention unit can also estimate the relative importance of each feature vector of the hidden representation in predicting the estimated character. The character attention unit can generate a character context vector that represents the importance of the hidden representation vectors.

This character context vector output by the character attention unit can be received by the character decoder of the automatic speech recognition neural network. The character decoder can use the character context vector to predict a character unit. The character decoder can also use previously decoded output characters in predicting the current character unit. The character unit can represent which of the 26 English characters is predicted from the character context vector. The character decoder can be comprised of BLSTM layers (e.g., two layers). The decoder can also have a softmax function to normalize the representation of each of the 26 English characters in the character unit. This normalized representation can be used to predict a character (e.g., based on which unit from the character unit has the highest value).

Further, when undergoing adaptation using this modified framework, the word attention unit can receive the hidden representation from the encoder and align the neural network in such a way that given a sequence of audio, the network can identify where a word starts and ends. The word attention unit can also estimate the relative importance of each feature vector of the hidden representation in predicting the word unit. The word attention unit can generate a word context vector that represents the importance of the hidden representation vectors.

This word context vector output by the word attention unit can be received by the word decoder of the automatic speech recognition neural network. The word decoder can use the word context vector to predict a word unit. The word decoder can also use previously decoded output word units in predicting the current word unit. The word unit can represent which of a set of English words is predicted from the word context vector. The word decoder can be comprised of BLSTM layers (e.g., two layers). The decoder can also have a softmax function to normalize a vector into a probability distribution having a total sum equal to one. In this way, the softmax function can normalize the representation of each of a number of English words in the word unit (e.g., 500 words, 5,000 words). This normalized representation can be used to predict a word (e.g., based on which unit from the word unit has the highest value).

During adaptation of the automatic speech recognition neural network to incorporate word loss, the network can be updated for error. For example, cross-entropy loss can be used to determine differences between the output from the character decoder and the word decoder and corresponding ground truth outputs for each decoder output. Loss from the character decoder and the word decoder can be combined and fed back through the automatic speech recognition neural network to appropriately update the neural network, for instance, by adjusting the weight of the parameters of the network connections to reduce the value of the errors.

Word loss adaptation can be performed using, for example, training engine 220 in conjunction with the components of automatic speech recognition engine 206. This process can be repeated for a sufficiently large number of training cycles, until the automatic speech recognition neural network converges to a state where the output reaches a desired threshold level of accuracy. Such accuracy can be determined using a test set of data from the target dataset. The test set of data can be a timeframe of audio recording from the target dataset that was not used during training of the automatic speech recognition neural network (e.g., brand new data that still has a known ground truth that can be used to determine accuracy of the network).

When the modified automatic speech recognition neural network reaches a desired level of accuracy, the word attention unit and word decoder can be removed from the network. With the word attention unit and word decoder removed, the neural network still maintains the information learned from incorporating word loss. However, by removing these layers, the final neural network outputs characters and not words. This is advantageous because the network is not limited to predicting trained words (e.g., the network predicts characters that can comprise words that have not been previously encountered).

Alignment element 216 can also be applied to embodiments of the automatic speech recognition neural network (e.g., based on an encoder-decoder architecture as discussed previously). The alignment element can be used to align attention weights determined using the attention unit. Aligning attention weights prevents erroneous attention weights from being included in the context vector. Aligning the attention weights can utilize the information learned during the initial training while ensuring that outputs predicted in a customized system are focused on the correct hidden representations when generating a context vector. This increases the accuracy by the decoder.

To align attention weights, the alignment element can be used to apply a loss function to the attention unit. In an embodiment, the sequence of features that correspond to a particular output can be compared with the actual sequence of features that should correspond to the output (e.g., ground truth). For instance, the attention unit can receive a hidden representation vector and predict that of the feature vectors encoded in the hidden representation vector feature vectors 2, 3, and 5 correspond to an output (e.g., the character "a"). These predicted feature vectors can be indicated using, for example, the context vector. The predicted features can be compared with a ground truth, for example, that feature vectors 2, 3, and 4 should correspond to the output. This comparison can be used to determine error in the attention unit.

In an embodiment, alignment can be performed for an automatic speech recognition neural network trained to predict characters. Alignment can be implemented using the Viterbi algorithm. Frames of speech can be input into the encoder of the network to produce attention-weights at the attention unit. A Kullback Lieblar divergence can be used to determine differences between the predicted attention weights and the ground-truth alignment. Such differences can be used to try to minimize error by the attention unit.

The automatic speech recognition neural network can generate an output (e.g., predicted character or predicted byte-pair). Such an output can be in a form that needs to be translated to determine the actual predicted output. For instance, the automatic speech recognition neural network can generate a predicted character as a character unit (e.g., a 26-dimension vector). In other embodiments, the automatic speech recognition neural network can generate a predicted byte-pair as a byte-pair unit (e.g., a 5,000-dimension vector). Such a character unit or a byte-pair can undergo a decoding process (i.e., translation) from vector form into an actual prediction. Such a decoding process/translation can generate the actual predicted character or byte-pair from the output generated by the automatic speech recognition neural network. Such a decoding process/translation can be performed using, for example a language model (e.g., using language model engine 218).

Language model engine 218 can be used to train and/or implement the language model of the speech recognition neural network system. In embodiments, the language model engine can be used predict sequences of words. A language model can be used to learn the likelihood of occurrence of an item based on a previous sequence of items (e.g., characters, words, or byte-pairs). For instance, the language model engine can be implemented using a language neural network. The language neural network can be trained using a dataset (e.g., a generic dataset). The generic dataset can be received from data store 202 and/or from a remote device, such as from a server or a user device. In other embodiments, the language model engine can receive data to process from an automatic speech recognition neural network. The language model engine can help in a decoding process (i.e., translation) to generate a transcript from the output generated by the automatic speech recognition neural network (e.g., characters or byte-pairs). The language model is further discussed with reference to FIGS. 3-5.

Training engine 220 can be used to adjust the customizable speech recognition neural network system. The training engine can be used during training and/or adaptation to change at least one node parameter of the customizable speech recognition neural network system. In particular, training engine 220 can interact with the components of automatic speech recognition engine 208 during training and/or adaptation of the automatic speech recognition neural network. Further, training engine 220 can interact with the components of language model 218 during training and/or adaptation of the language model neural network.

Figure 3:
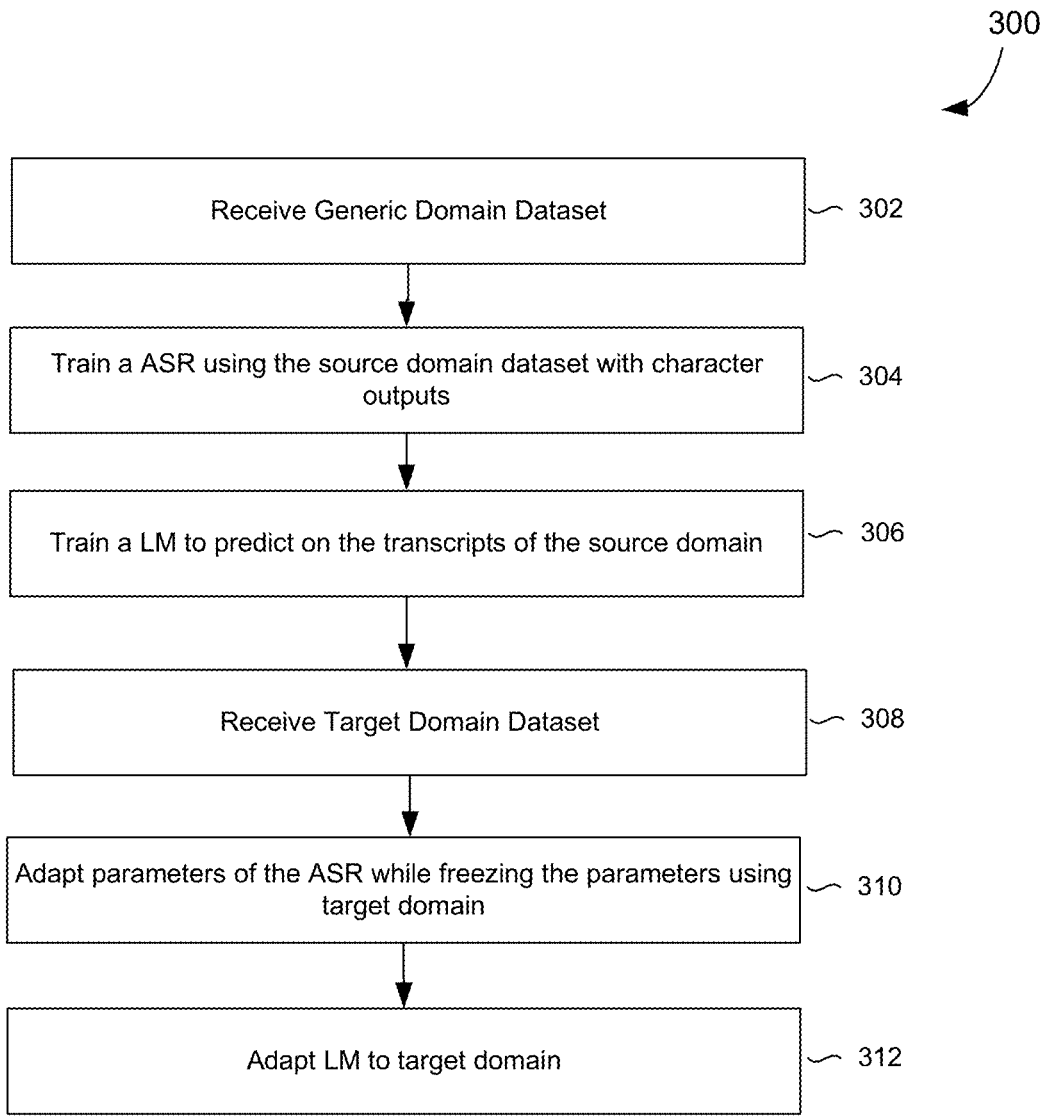
FIG. 3 depicts a process flow showing an embodiment of a method for training a speech recognition system, in accordance with embodiments of the present disclosure.

With reference to FIG. 3, a process flow is provided showing an embodiment of method 300 for training a customizable speech recognition, in accordance with embodiments of the present disclosure. The speech recognition system can be comprised of a customizable neural network system. Such a system can be made up of one or more neural networks (e.g., an automatic speech recognition model and a language model). Such a speech recognition system can apply an automatic speech recognition model to predict characters from input vocal utterances and a language model to process the predicted characters to determine the likelihood of occurrence of a word from the predicted characters. Aspects of method 300 can be performed, for example, by automatic speech recognition engine 206 and language model engine 218 in conjunction with training engine 220, as illustrated in FIG. 2.

At block 302, a dataset can be received for use in training the speech recognition system. A dataset can be a conglomeration of vocal utterances. For instance, a dataset can be a generic dataset (e.g. a large speech-based dataset). The dataset can be split into timeframes of the audio recording. In embodiments, the dataset can undergo processing by converting the vocal utterances into vectors (e.g., by extracting feature vectors). These vectors can be represented using a fixed dimension vector. Because neural networks can have difficulty in data in raw form, converting the dataset into feature vectors allows for more effective and efficient analysis by a network. In some embodiments, the dataset can be pre-processed to extract feature vectors corresponding to the timeframes of audio recording. In other embodiments, the dataset can be processed upon receipt to extract feature vectors corresponding to the timeframes of audio recording.

The generic dataset can also be divided into a training set and a test set. The training set can be used to train the speech recognition system (e.g., an automatic speech recognition model and/or a language model). In particular, the training set of the generic dataset can be used to initially train an automatic speech recognition model of the speech recognition system. The training set of the generic dataset can also be used to initially train a language model of the speech recognition system. Such training of the automatic speech recognition model and the language model can be performed in parallel. The test set can be used to assess the final trained automatic speech recognition model and/or language model.

At 304, an automatic speech recognition model (e.g., "ASR") can be trained in a generic domain to predict characters (e.g., when trained using a generic dataset). The automatic speech recognition model can be implemented using a neural network. For instance, an encoder-decoder neural network architecture can be used for such a neural network.

Fixed dimension vector(s) that correspond to an audio recording utterance can be input into an encoder. This fixed dimension vector can be processed by the encoder to generate a sequence of hidden representations. The hidden representations can be comprised of a sequence of vectors (i.e., hidden representation vectors). The hidden representation vectors can be received by an attention unit. The attention unit cam estimate the relative importance of the feature vectors that comprise the hidden representation vectors generate a context vector. This context vector can also align the model in such a way that given a sequence of audio (e.g., audio recording utterance), the model can identify where a character starts and ends.

The decoder can receive the context vector to predict a character unit. The decoder can also use previously decoded output characters in predicting the current character unit. The character unit can represent which of the 26 English characters is predicted from the context vector. During this initial training of the automatic speech recognition model, the model can be updated for error (e.g., using cross-entropy loss). Error(s) can be determine based on differences between the output from the network and a ground truth output. Such errors are then fed back through the automatic speech recognition model, for instance, by adjusting the weight of the network connections to reduce the value of the errors. The process of training the automatic speech recognition model and updating for error can be repeated for a sufficiently large number of cycles, until the model converges to a state where the error is small enough such that the output (e.g., character unit) reaches a desired threshold minimum of loss.

At 306, a language model (e.g., "LM") can be trained to predict a next item in a sequence of data. In one embodiment, the language model can indicate the likelihood of occurrence of a word based on a previous sequence of words. In another embodiment, the language model can indicate the likelihood of occurrence of a character based on a previous sequence of characters. The language model can be implemented using a neural network. For instance, a recurrent neural network architecture can be used for such a neural network. Using a recurrent neural network can create loops in the neural network architecture to link the "memories" the neurons in the network. Linking such "memories" allows the network to remember what it has learned.

Data can be input into the language model to train the model in the generic domain (e.g., when trained using a generic dataset). In embodiments, the input into the language model can be a 26-dimension vector. During training, the input 26-dimension vector can be, for example, the character unit output by the automatic speech recognition model. In other embodiments, the input can be generated separately from the automatic speech recognition model. The language model can predict word(s) from character units (e.g., 26-dimension vector representing predicted characters) based on other words predicted in a sequence. In other embodiments, the language model can predict characters(s) from character units based on previous characters predicated in a sequence. During this initial training of the language model, the model can be updated for error. Error(s) can be determine based on differences between the output from the network and a ground truth output. Such errors are then fed back through the language model, for instance, by adjusting the weight of the network connections to reduce the value of the errors. The process of training the language model and updating for error can be repeated for a sufficiently large number of cycles, until the model converges to a state where the error is small enough such that the output reaches a desired threshold minimum of loss.

At block 308, a dataset can be received for use in adapting the speech recognition system. A dataset can be a conglomeration of vocal utterances. For instance, a dataset can be a target dataset (e.g. a small speech-based dataset for a target domain). The dataset can be split into timeframes of audio recording from the target dataset. In embodiments, the dataset can undergo processing by converting the vocal utterances into vectors (e.g., by extracting feature vectors). These vectors can be represented using a fixed dimension vector. Converting the dataset into feature vectors can allow for more effective and efficient analysis by a network. In some embodiments, the dataset can be pre-processed to extract feature vectors corresponding to the timeframes of audio recording. In other embodiments, the dataset can be processed upon receipt to extract feature vectors corresponding to the timeframes of audio recording.

The target dataset can be divided into a training set and a test set. The training set can be used to adapt the speech recognition system (e.g., an automatic speech recognition model and/or a language model). In particular, the training set of the generic dataset can be used to adapt the automatic speech recognition model of the speech recognition system. The training set of the generic dataset can also be used to adapt the language model of the speech recognition system. Such adaptation of the automatic speech recognition model and the language model can be performed in parallel. The test set can be used to assess the final adapted automatic speech recognition model and/or language model.

At block 310, the parameters of the automatic speech recognition model can be adapted using the target domain.

Adapting the automatic speech recognition model maintains the high accuracy at predicting characters from input audio learned from the generic domain while tailoring the model for the specific target domain of interest. In this way, adaptation ensures that the model understands words, phrases, terms, etc. related to the target domain.

In particular, to adapt the model, layers of the model can be frozen (e.g., the encoder, attention unit, and/or decoder). By freezing layers of the network, only parameters/weights of the unfrozen layer(s) are updated during adaptation. In one embodiment, freezing the encoder can maintain the information that the encoder of the automatic speech recognition model learned from the large generic dataset.

To perform adaptation, the encoder of the automatic speech recognition neural network can receive an utterance from the target domain as a fixed dimension vector. This fixed dimension vector can be processed by the encoder to generate a sequence of hidden representations. The hidden representations can be represented as a hidden representation vector. The hidden representation vector can be received by an attention unit. The attention unit can estimate the relative importance of the feature vectors that comprise the hidden representation vector generate a context vector. This context vector can also align the model in such a way that given a sequence of audio (e.g., audio recording utterance), the model can identify where a character starts/ends. The decoder can receive the context vector to predict a character unit. The character unit can represent which of the 26 English characters is predicted from the context vector. The decoder can also use previously decoded output characters in predicting the current character unit.

During adaptation of the automatic speech recognition model, the unfrozen layers of the model can be updated for error (e.g., using cross-entropy loss). Error(s) can be determine based on differences between the output from the network and a ground truth output. Such errors are then fed back through the automatic speech recognition model, for instance, by adjusting the weight of the unfrozen network connections to reduce the value of the errors. The process of adapting the automatic speech recognition model and updating for error can be repeated for a sufficiently large number of cycles, until the model converges to a state where the error is small enough such that the output (e.g., character unit) reaches a desired threshold minimum of loss.

At 312, the language model can be adapted to predict sequences of words for the target domain. Data can be input into the language model to adapt the model to the target domain. In embodiments, the input into the language model can be a 26-dimension vector. During adaptation, the input 26-dimension vector can be, for example, the character unit output by the automatic speech recognition model. In other embodiments, the input can be generated separately from the automatic speech recognition model. The language model can predict words from the character unit(s) based on the words already observed in the sequence. The language model can also predict characters from the character unit(s) based on the characters already observed in the sequence. During adaptation of the language model, the model can be updated for error. Error(s) can be determine based on differences between the output from the network and a ground truth output. Such errors are then fed back through the language model, for instance, by adjusting the weight of the network connections to reduce the value of the errors. In some embodiments, layers of the language model can be frozen such that only unfrozen layers are updated during adaptation. The process of adapting the language model and updating for error can be repeated for a sufficiently large number of cycles, until the model converges to a state where the error is small enough such that the output reaches a desired threshold minimum of loss.

Figure 4:
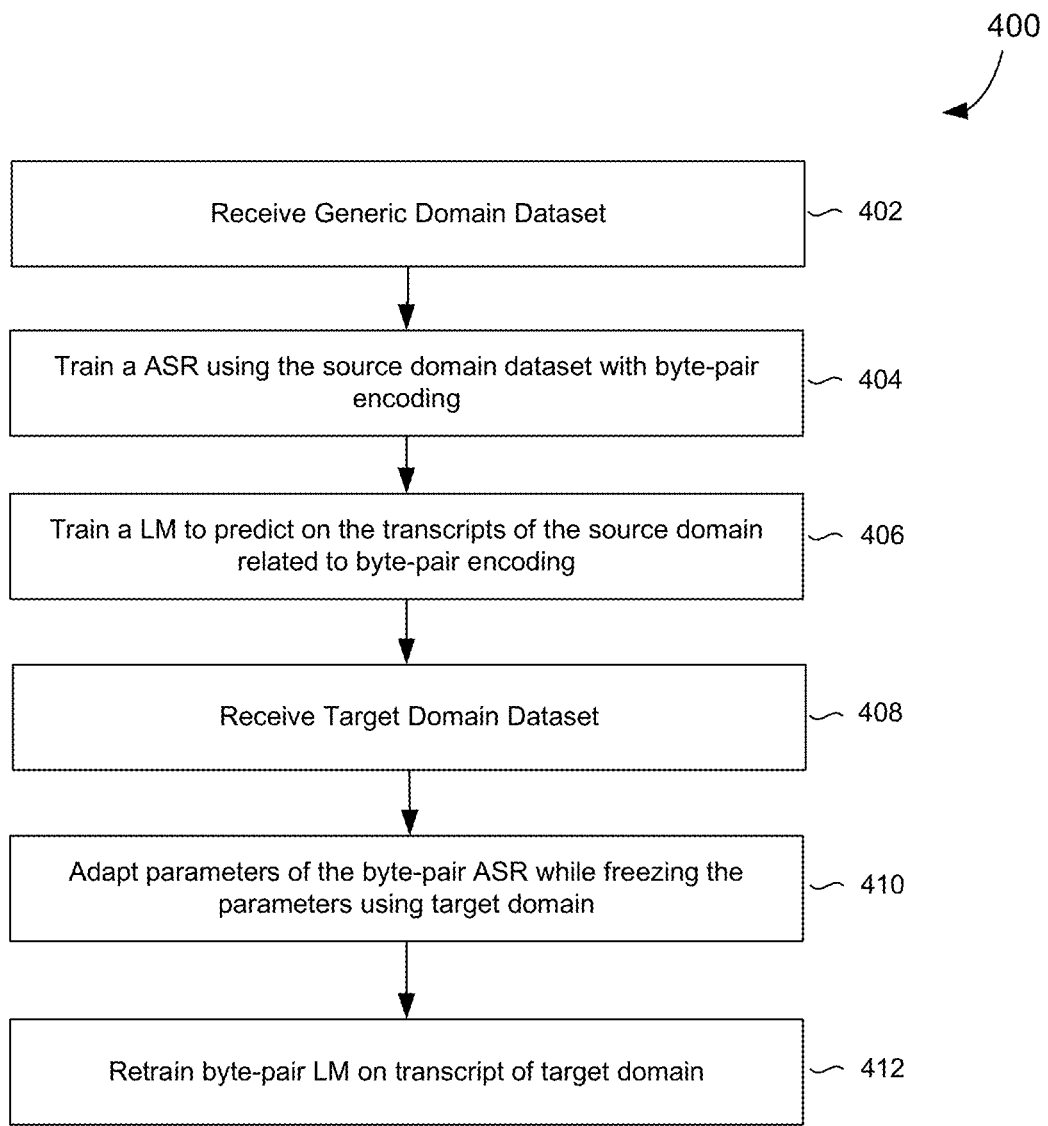
FIG. 4 depicts a process flow showing an embodiment of a method for training a speech recognition system, in accordance with embodiments of the present disclosure.

With reference to FIG. 4, a process flow is provided showing an embodiment of method 400 for training a customizable speech recognition system, in accordance with embodiments of the present disclosure. The customizable speech recognition system can be comprised of a neural network system made up of one or more neural networks (e.g., an automatic speech recognition model and a language model model). Such a customizable speech recognition system can implement an automatic speech recognition model to predict byte-pairs from input vocal utterances and a language model to process the predicted byte-pairs to determine the likelihood of occurrence of a word from the predicted byte-pairs. Aspects of method 400 can be performed, for example, by automatic speech recognition engine 206 and language model engine 218 in conjunction with training engine 220, as illustrated in FIG. 2.

At block 402, a dataset can be received for use in training the speech recognition system. A dataset can be a conglomeration of vocal utterances. For instance, a dataset can be a generic dataset (e.g. a large speech-based dataset). The dataset can be split into timeframes of audio recording from the generic dataset. In embodiments, the dataset can undergo processing by converting the vocal utterances into vectors (e.g., by extracting feature vectors). These vectors can be represented using a fixed dimension vector. Converting the dataset into feature vectors can allow for more effective and efficient analysis by a network. In some embodiments, the dataset can be pre-processed to extract feature vectors corresponding to the timeframes of audio recording. In other embodiments, the dataset can be processed upon receipt to extract feature vectors corresponding to the timeframes of audio recording.

The generic dataset can be divided into a training set and a test set. The training set can be used to train the speech recognition system (e.g., an automatic speech recognition model and/or a language model). In particular, the training set of the generic dataset can be used to initially train an automatic speech recognition model of the speech recognition system. The training set of the generic dataset can also be used to initially train a language model of the speech recognition system. Such training of the automatic speech recognition neural network and the language model neural network can be performed in parallel. The test set can be used to assess the final trained automatic speech recognition model and/or language model.

At 404, an automatic speech recognition model (e.g., "ASR") can be trained in a generic domain to predict byte-pairs. Byte-pair encoding can be used to represent larger grouping of characters. The automatic speech recognition model can be implemented using a neural network. For instance, an encoder-decoder neural network architecture can be used for such a model.

Fixed dimension vector(s) that correspond to an audio recording utterance can be input into an encoder. This fixed dimension vector can be processed by the encoder to generate a sequence of hidden representations. The hidden representations can be comprised of a sequence of vectors (i.e., hidden representation vectors). The hidden representation vectors can be received by an attention unit. The attention unit can estimate the relative importance of the feature vectors that comprise the hidden representation vectors generate a context vector. This context vector can also align the model in such a way that given a sequence of audio (e.g., audio recording utterance), the model can identify where a byte-pair starts and ends. The decoder can receive the context vector to predict a byte-pair unit. The decoder can also use previously decoded output byte-pair units in predicting the current byte-pair unit. The byte-pair unit can represent which of the set of the most common groupings of characters is predicted from the context vector (e.g., 5,000 byte-pair set). During this initial training of the automatic speech recognition model, the model can be updated for error (e.g., using cross-entropy loss). Error(s) can be determine based on differences between the output from the network and a ground truth output. Such errors are then fed back through the automatic speech recognition model, for instance, by adjusting the weight of the network connections to reduce the value of the errors. The process of training the automatic speech recognition model and updating for error can be repeated for a sufficiently large number of cycles, until the model converges to a state where the error is small enough such that the output (e.g., byte-pair unit) reaches a desired threshold minimum of loss.

At 406, a language model (e.g., "LM") can be trained to predict sequences of words. In particular, the language model can indicate the likelihood of occurrence of a word based on a previous sequence of words. The language model can be implemented using a neural network. For instance, a recurrent neural network architecture can be used for such a neural network. In other embodiments, the language model engine can receive a data to process from an automatic speech recognition neural network. The language model engine can help in a decoding process to generate words from byte-pair units generated by the automatic speech recognition neural network.

Data can be input into the language model to train the model in the generic domain. In particular, the input into the language model can be a dimension vector (e.g., 5,000-dimension vector indicating the set of byte-pair units). During training, the input dimension vector can be, for example, the byte-pair unit output by the automatic speech recognition model. In other embodiments, the input can be generated separately from the automatic speech recognition model. The language model can predict byte-pairs from the byte-pair unit(s) based on the byte-pairs already observed in the sequence. During this initial training of the language model, the model can be updated for error. Error(s) can be determine based on differences between the output from the network and a ground truth output. Such errors are then fed back through the language model, for instance, by adjusting the weight of the network connections to reduce the value of the errors. The process of training the language model and updating for error can be repeated for a sufficiently large number of cycles, until the model converges to a state where the error is small enough such that the output reaches a desired threshold minimum of loss.

At block 408, a dataset can be received for use in adapting the speech recognition system. A dataset can be a conglomeration of vocal utterances. For instance, a dataset can be a target dataset (e.g. a small speech-based dataset for a target domain). The dataset can be split into timeframes of audio recording from the target dataset. In embodiments, the dataset can undergo processing by converting the vocal utterances into vectors (e.g., by extracting feature vectors). These vectors can be represented using a fixed dimension vector. Because neural networks can have difficulty in data in raw form, converting the dataset into feature vectors allows for more effective and efficient analysis by a network. In some embodiments, the dataset can be pre-processed to extract feature vectors corresponding to the timeframes of audio recording. In other embodiments, the dataset can be processed upon receipt to extract feature vectors corresponding to the timeframes of audio recording.

The target dataset can be divided into a training set and a test set. The training set can be used to adapt the speech recognition system (e.g., an automatic speech recognition neural network and/or a language model neural network). In particular, the training set of the target dataset can be used to adapt the automatic speech recognition neural network of the speech recognition system. The training set of the target dataset can also be used to adapt the language model neural network of the speech recognition system. Such adaptation of the automatic speech recognition model and the language model neural network can be performed in parallel. The test set can be used to assess the final adapted automatic speech recognition model and/or language model.

At block 410, the parameters of the automatic speech recognition model can be adapted to the target domain. Adapting the automatic speech recognition model maintains the high accuracy at predicting byte-pairs from input audio learned from the generic domain while tailoring the model to the specific target domain of interest. In this way, adaptation ensures that the model understands words, phrases, terms, etc. related to the target domain. In particular, to adapt the model, layers of the model can be frozen (e.g., the encoder, attention unit, and/or decoder). By freezing layers of the network, only parameters/weights of the unfrozen layer(s) are updated during adaptation. In one embodiment, freezing the encoder can maintain the information that the encoder learned from the large generic dataset during the initial training.

To perform adaptation, the encoder of the automatic speech recognition neural network can receive an utterance from the target domain as a fixed dimension vector. This fixed dimension vector can be processed by the encoder to generate a sequence of hidden representations. The hidden representations can be comprised of a sequence of vectors (i.e., hidden representation vectors). The hidden representation vectors can be received by an attention unit. The attention unit cam estimate the relative importance of the feature vectors that comprise the hidden representation vectors generate a context vector. This context vector can also align the model in such a way that given a sequence of audio (e.g., audio recording utterance), the model can identify where a byte-pair starts and ends. The decoder can receive the context vector to predict a byte-pair unit. The decoder can also use previously decoded output characters in predicting the current byte-pair unit. The byte-pair unit can represent which of the 5,000 byte-pairs is predicted from the context vector.

During adaptation of the automatic speech recognition model, the unfrozen layers of the model can be updated for error (e.g., using cross-entropy loss). Error(s) can be determine based on differences between the output from the network and a ground truth output. Such errors are then fed back through the automatic speech recognition model, for instance, by adjusting the weight of the unfrozen network connections to reduce the value of the errors. The process of adapting the automatic speech recognition model and updating for error can be repeated for a sufficiently large number of cycles, until the model converges to a state where the error is small enough such that the output (e.g., byte-pair unit) reaches a desired threshold minimum of loss At 412, the language model can be adapted to predict sequences of words for the target domain. Data can be input into the language model to adapt the model to the target domain. In particular, the input into the language model can be a dimension vector (e.g., 5,000-dimension vector). During adaptation, the input dimension vector can be, for example, the byte-pair unit output by the automatic speech recognition model. In other embodiments, the input can be generated separately from the automatic speech recognition model. The language model can predict byte-pairs from the byte-pair unit(s) based on the byte-pairs already observed in the sequence. During adaptation of the language model, the model can be updated for error. Error(s) can be determine based on differences between the output from the network and a ground truth output. Such errors are then fed back through the language model, for instance, by adjusting the weight of the network connections to reduce the value of the errors. In some embodiments, layers of the language model can be frozen such that only unfrozen layers are updated during adaptation. The process of adapting the language model and updating for error can be repeated for a sufficiently large number of cycles, until the model converges to a state where the error is small enough such that the output reaches a desired threshold minimum of loss.

Figure 5:
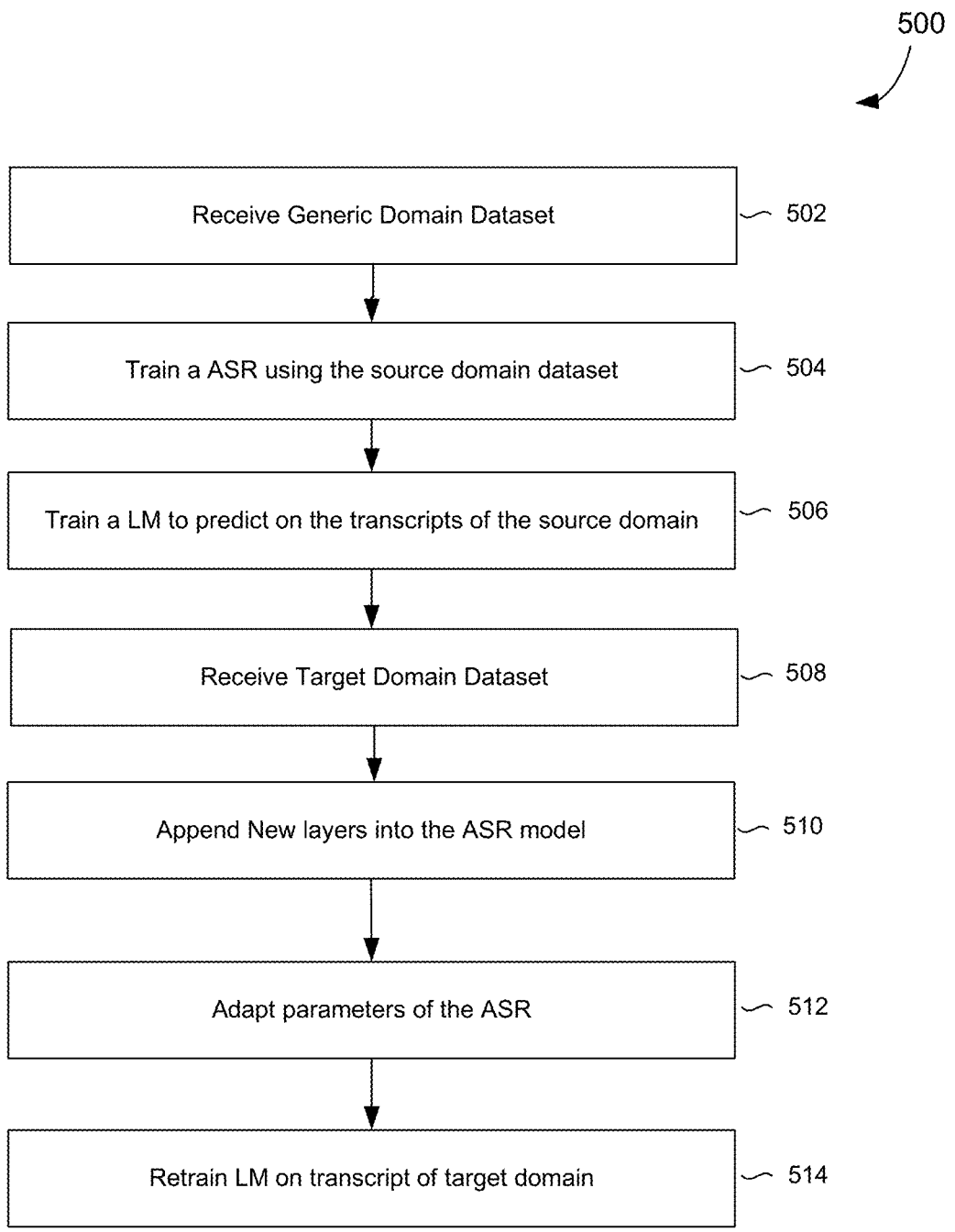
FIG. 5 depicts a process flow showing an embodiment of a method for training a speech recognition system, in accordance with embodiments of the present disclosure.

With reference to FIG. 5, a process flow is provided showing an embodiment of method 500 for training a speech recognition system (e.g., speech recognition neural network system), in accordance with embodiments of the present disclosure. The speech recognition system can be comprised of a neural network system. Such a system can be made up of one or more neural networks (e.g., an automatic speech recognition model and a language model). Such a speech recognition system can implement an automatic speech recognition model incorporate word loss for understanding input vocal utterances and a language model to process the predicted output (e.g., character units) to determine the likelihood of occurrence of a word from the predicted output (e.g., character units). Aspects of method 500 can be performed, for example, by automatic speech recognition engine 206 and language model engine 218 in conjunction with training engine 220, as illustrated in FIG. 2.

At block 502, a dataset can be received for use in training the speech recognition system. A dataset can be a conglomeration of vocal utterances. For instance, a dataset can be a generic dataset (e.g. a large speech-based dataset). The dataset can be split into timeframes of audio recording from the generic dataset. In embodiments, the dataset can undergo processing by converting the vocal utterances into vectors (e.g., by extracting feature vectors). These vectors can be represented using a fixed dimension vector. Converting the dataset into feature vectors allows for more effective and efficient analysis by a network. In some embodiments, the dataset can be pre-processed to extract feature vectors corresponding to the timeframes of audio recording. In other embodiments, the dataset can be processed upon receipt to extract feature vectors corresponding to the timeframes of audio recording.

The generic dataset can be divided into a training set and a test set. The training set can be used to train the speech recognition system (e.g., an automatic speech recognition model and/or a language model). In particular, the training set of the generic dataset can be used to initially train an automatic speech recognition model of the speech recognition system. The training set of the generic dataset can also be used to initially train a language model of the speech recognition system. Such training of the automatic speech recognition model and the language model can be performed in parallel. The test set can be used to assess the final trained automatic speech recognition model and/or language model.

At 504, an automatic speech recognition model (e.g., "ASR") can be trained in a generic domain to predict an output (e.g., characters or byte-pairs). The automatic speech recognition model can be implemented using a neural network. For instance, an encoder-decoder neural network architecture can be used for such a neural network.

Fixed dimension vector(s) that correspond to an audio recording utterance can be input into an encoder. This fixed dimension vector can be processed by the encoder to generate a sequence of hidden representations. The hidden representations can be comprised of a sequence of vectors (i.e., hidden representation vectors). The hidden representation vectors can be received by an attention unit. The attention unit cam estimate the relative importance of the feature vectors that comprise the hidden representation vectors generate a context vector. This context vector can also align the model in such a way that given a sequence of audio (e.g., audio recording utterance), the model can identify where a unit (e.g., character or byte-pair) starts and ends. The decoder can receive the context vector to predict a unit (e.g., character unit or byte-pair unit). The decoder can also use previously decoded output unit in predicting the current unit. A character unit can represent which of the 26 English characters is predicted from the context vector. A byte-pair unit can represent which of a set of 5,000 English byte-pairs is predicted from the context vector. During this initial training of the automatic speech recognition model, the model can be updated for error (e.g., using cross-entropy loss). Error(s) can be determine based on differences between the output from the network and a ground truth output. Such errors are then fed back through the automatic speech recognition model, for instance, by adjusting the weight of the network connections to reduce the value of the errors. The process of training the automatic speech recognition model and updating for error can be repeated for a sufficiently large number of cycles, until the model converges to a state where the error is small enough such that the output (e.g., character unit or byte-pair unit) reaches a desired threshold minimum of loss.

At 506, a language model (e.g., "LM") can be trained to predict sequences of words. Data can be input into the language model to train the model in the generic domain. In particular, the input into the language model can be a dimension vector (e.g., a 26-dimension vector, a 5,000-dimension vector). During training, the input dimension vector can be, for example, the unit output by the automatic speech recognition model. In other embodiments, the input can be generated separately from the automatic speech recognition model. The language model can predict words. During this initial training of the language model, the model can be updated for error. Error(s) can be determine based on differences between the output from the network and a ground truth output. Such errors are then fed back through the language model, for instance, by adjusting the weight of the network connections to reduce the value of the errors. The process of training the language model and updating for error can be repeated for a sufficiently large number of cycles, until the model converges to a state where the error is small enough such that the output reaches a desired threshold minimum of loss.

At block 508, a dataset can be received for use in adapting the speech recognition system. A dataset can be a conglomeration of vocal utterances. For instance, a dataset can be a target dataset (e.g. a small speech-based dataset for a target domain). The dataset can be split into timeframes of audio recording from the target dataset. In embodiments, the dataset can undergo processing by converting the vocal utterances into vectors (e.g., by extracting feature vectors). These vectors can be represented using a fixed dimension vector. Because neural networks can have difficulty in data in raw form, converting the dataset into feature vectors allows for more effective and efficient analysis by a network. In some embodiments, the dataset can be pre-processed to extract feature vectors corresponding to the timeframes of audio recording. In other embodiments, the dataset can be processed upon receipt to extract feature vectors corresponding to the timeframes of audio recording.

The target dataset can be divided into a training set and a test set. The training set can be used to adapt the speech recognition system (e.g., an automatic speech recognition model and/or a language model). In particular, the training set of the generic dataset can be used to adapt the automatic speech recognition model of the speech recognition system. The training set of the generic dataset can also be used to adapt the language model of the speech recognition system. Such adaptation of the automatic speech recognition model and the language model can be performed in parallel. The test set can be used to assess the final adapted automatic speech recognition model and/or language model.

At block 510, new layers can be appended into the automatic speech recognition model. These new layers can be used to incorporate word knowledge into the automatic speech recognition model. Incorporating word loss during adaptation of the model results in the hidden representations produced by the encoder to include information useful for not only predicting an accurate output based on characters or byte-pairs but also based on predicted words.

The two layers added to the automatic speech recognition model can be an additional attention unit and a decoder. In this way, a single encoder can be used to receive an utterance as a fixed dimension vector. The encoder can process this fixed dimension vector to produce a sequence of hidden representations corresponding to the audio recording utterance. The hidden representations can then be received by two different attention units, one linked to a decoder for outputting characters or byte-pairs and the other linked to a decoder for outputting words. In this way, the encoder, the first attention unit, and the first decoder can be previously trained using a generic dataset as discussed above with reference to FIG. 2. The second attention unit and the second decoder can be added to the automatic speech recognition neural network during adaptation of the model using the target dataset.

At block 512, the parameters of the automatic speech recognition model can be adapted using the target domain. Adapting the automatic speech recognition model maintains the high prediction accuracy from input audio learned from the generic domain while tailoring the model for the specific target domain of interest. In this way, adaptation ensures that the model understands words, phrases, terms, etc. related to the target domain.

In particular, to adapt the model, the first attention unit can receive the hidden representation from the encoder and align the neural network in such a way that given a sequence of audio, the network can identify where a unit (e.g., character unit or byte-pair unit) starts and ends. The first attention unit can also estimate the relative importance of each feature vector of the hidden representation in predicting the estimated unit. The first attention unit can generate a context vector that represents the importance of the hidden representation vectors. This context vector output by the first attention unit can be received by the first decoder of the automatic speech recognition neural network. The first decoder can use the context vector to predict a unit. The first decoder can also use previously decoded output unit in predicting the current unit.

Further, when undergoing adaptation using this modified framework, the second attention unit can receive the hidden representation from the encoder and align the neural network in such a way that given a sequence of audio, the network can identify where a word starts and ends. The second attention unit can also estimate the relative importance of each feature vector of the hidden representation in predicting the word unit. The second attention unit can generate a context vector that represents the importance of the hidden representation vectors. This context vector output by the second attention unit can be received by the second decoder of the automatic speech recognition neural network. The second decoder can use the context vector to predict a word unit. The second decoder can also use previously decoded output word units in predicting the current word unit. The word unit can represent which of a set of English words is predicted from the word context vector.

During adaptation, the automatic speech recognition model can be updated for error. For example, cross-entropy loss can be used to determine differences between the output from the first decoder and the second decoder and corresponding a ground truth outputs for each decoder. Loss from the decoders can be combined and fed back through the automatic speech recognition model to appropriately update the model, for instance, by adjusting the weight of the parameters of the model connections to reduce the value of the errors. This process can be repeated for a sufficiently large number of training cycles, until the automatic speech recognition model converges to a state where the output reaches a desired threshold level of accuracy.

Upon reaching a desired level of accuracy, the second attention unit and second decoder can be removed from the model. With the second attention unit and second decoder removed, the model still maintains the information learned from incorporating word loss. However, by removing these layers, the final model outputs characters and not words. This is advantageous because the model can output words that have not been previously encountered.

At 514, the language model can be adapted to predict sequences of words for the target domain. During adaptation of the language model, the model can be updated for error. Error(s) can be determine based on differences between the output from the network and a ground truth output. Such errors are then fed back through the language model, for instance, by adjusting the weight of the network connections to reduce the value of the errors. The process of adapting the language model and updating for error can be repeated for a sufficiently large number of cycles, until the model converges to a state where the error is small enough such that the a desired threshold minimum of loss.

Figure 6:
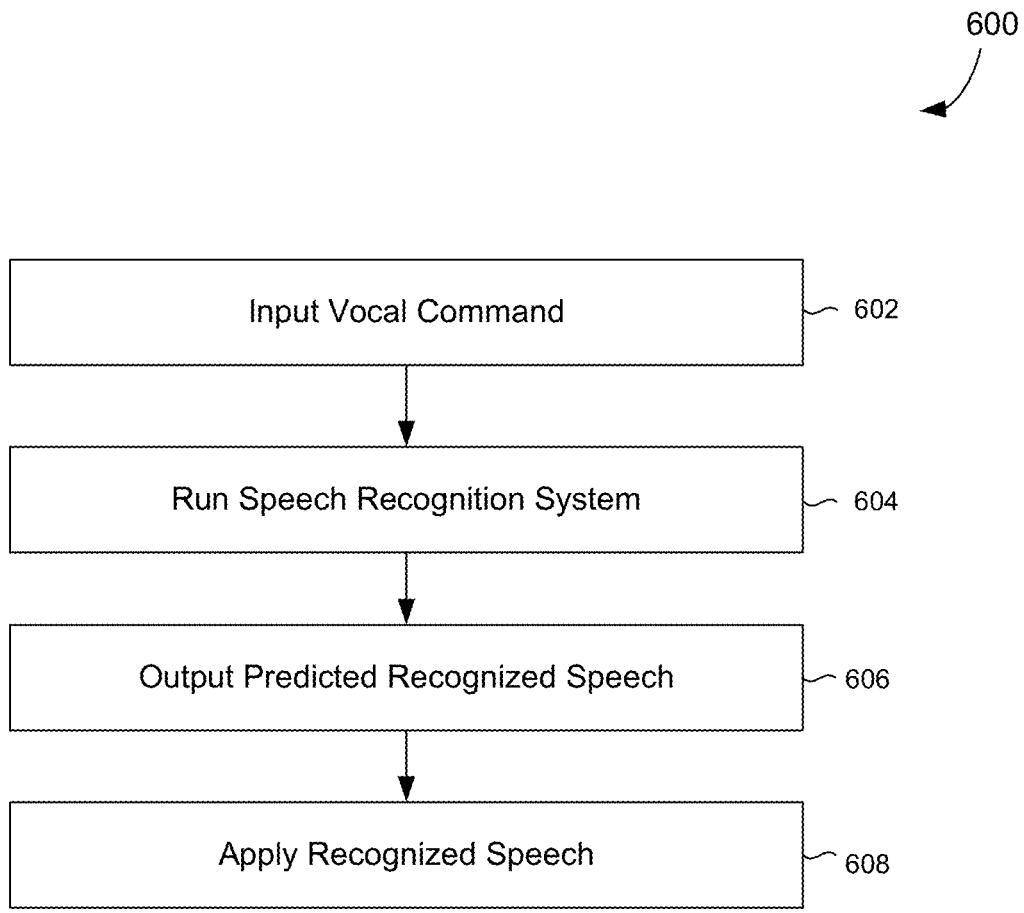
FIG. 6 depicts a process flow showing an embodiment of a method for implementing a trained speech recognition system, in accordance with embodiments of the present disclosure.

With reference to FIG. 6, a process flow is provided showing an embodiment of method 600 for implementing a trained speech recognition system (e.g., speech recognition neural network system), in accordance with embodiments of the present disclosure. The speech recognition system can be comprised of a neural network system. Such a system can be made up of one or more neural networks (e.g., an automatic speech recognition neural network and a language model neural network). Such a speech recognition system can implement an automatic speech recognition neural network for understanding input vocal utterances and a language model neural network to process the predicted outputs from the automatic speech recognition neural network to determine the likelihood of occurrence of a word from the predicted outputs. Aspects of method 600 can be performed, for example, by automatic speech recognition engine 206 and language model engine 218 as illustrated in FIG. 2.

At 602, an input vocal command can be received. The vocal command can be a timeframe of audio a segment of uttered speech, etc. Such an input can be processed into a fixed dimension vector comprised of extracted feature vectors. At 604, a speech recognition system can be run to process the received vocal command. The speech recognition system can be a customized speech recognition neural network system as discussed with reference to FIG. 2. At 604, a predicted recognized speech can be output. This predicted recognized speech can be applied at 606. For instance, the predicted recognized speech be applied in any number of functions. For instance, in conversational image editing.

Figure 7:
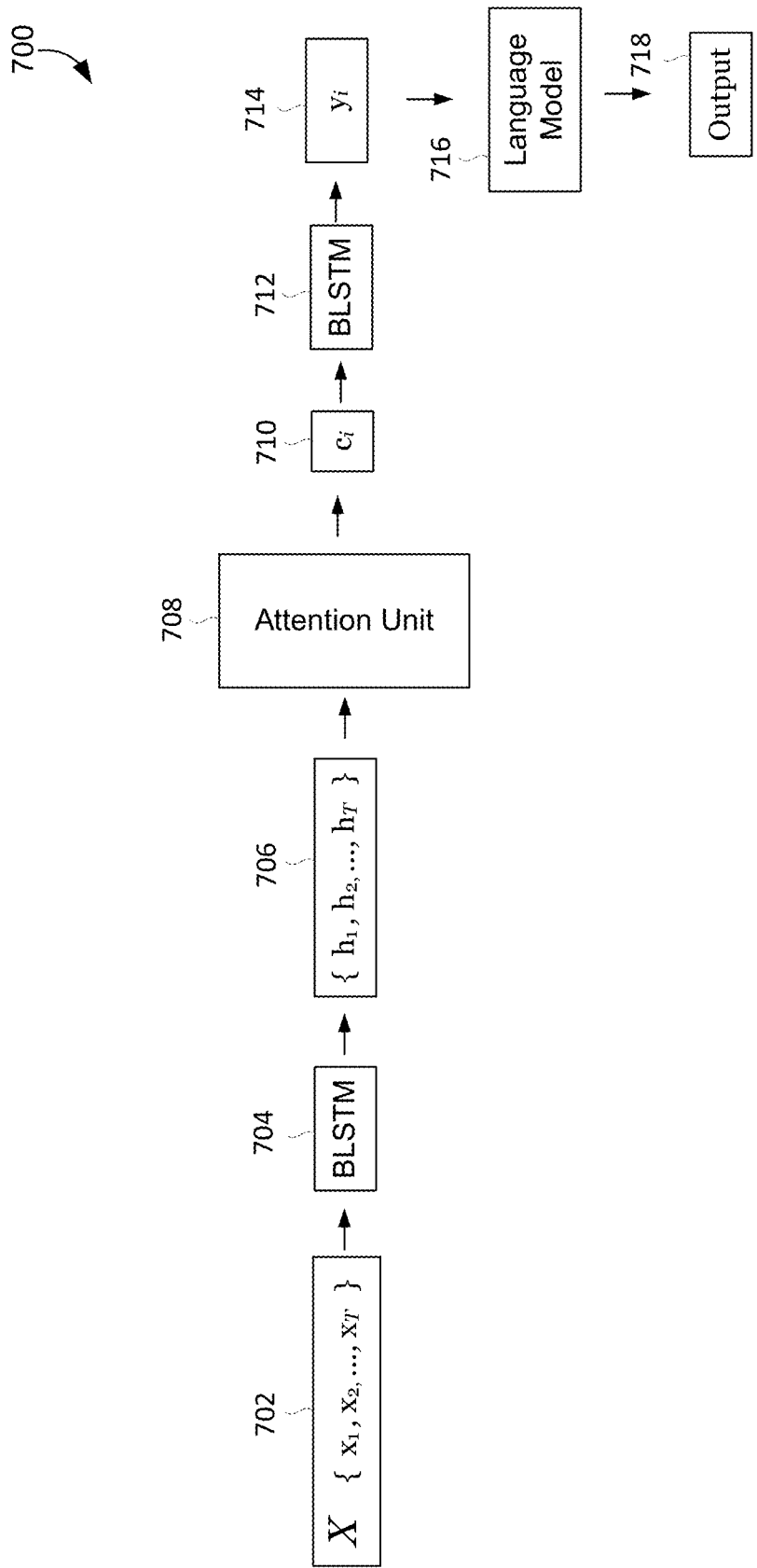
FIG. 7 illustrates an example environment that can be used for training and/or implementing a speech recognition system to recognize uttered speech, in accordance with embodiments of the present disclosure.

FIG. 7 illustrates an example environment 700 that can be used for training and/or implementing a speech recognition system to recognize uttered speech (e.g., vocal commands), in accordance with embodiments of the present disclosure. As depicted, the speech recognition system can be implemented using an automatic speech recognition neural network in conjunction with a language model neural network.

Input 702 can be a timeframe of audio (e.g., a vocal command, segment of uttered speech, etc.). Such an input can be a fixed dimension vector comprised of extracted feature vectors. This fixed dimension vector can be fed into BLSTM 704. BLSTM 704 can be an encoder comprised of multiple BLSTM layers (e.g., five layers). BLSTM can process input 702 to output hidden vector representations 706. Attention unit 708 can receive hidden vector representations 706. The attention unit can aligns the neural network in such a way that given a sequence of audio, the network can identify where a unit (e.g., character or byte-pair) starts and ends. Upon determining where units begin/end, the attention unit can determine a context vector 710. Context vector 710 can be input into BLSTM 712. BLSTM 712 can be a decoder comprised of multiple BLSTM layers (e.g., two layers). BLSTM 712 can output a unit 714 (e.g., character unit or byte-pair unit). Such a unit can be a dimension unit normalized using a softmax function. Unit 714 can be input into language model 716 for decoding. In particular, language model 716 can interpret the units into recognizable words. Output 718 can be the recognized words from language model 716. Output 718 can be applied in any number of functions. For instance, in conversational image editing.

During iterations in which the speech recognition system is undergoing training or adaptation, loss in the network can be determined by comparing unit 714 with a ground truth unit and/or comparing output 718 with a ground truth. Iterations of training can be repeated for a sufficiently large number of training cycles, until the neural networks of the system converge to a desired state (e.g., where errors fall below a predetermined threshold such that the output produced reaches a desired threshold minimum of loss between output and ground truth output).

Figure 8:
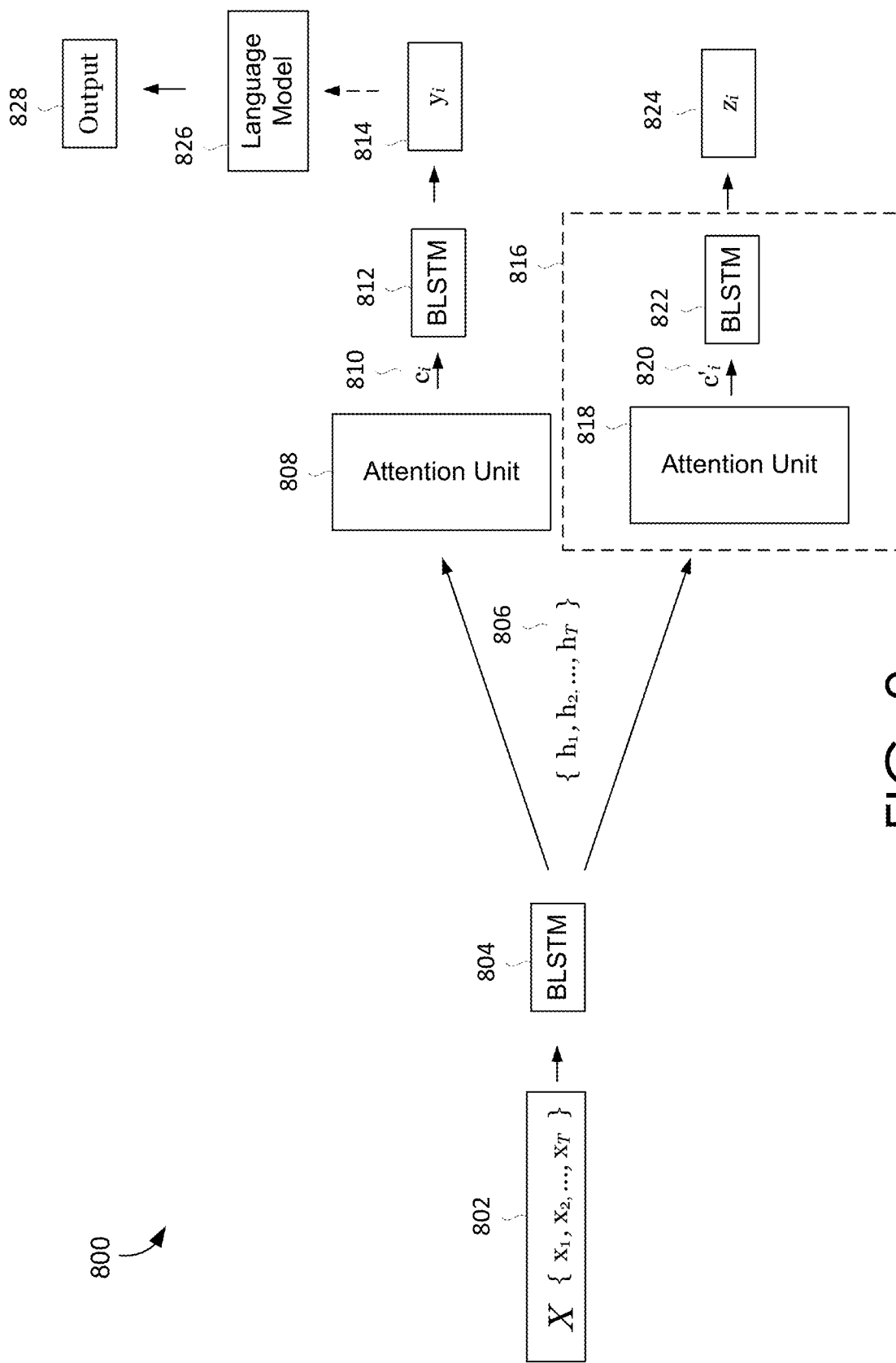
FIG. 8 illustrates an example environment that can be used for training and/or implementing a speech recognition system to recognize uttered speech, in accordance with embodiments of the present disclosure.

FIG. 8 illustrates an example environment 800 that can be used for training and/or implementing a speech recognition system to recognize uttered speech (e.g., vocal commands), in accordance with embodiments of the present disclosure. As depicted, the speech recognition system can be implemented using an automatic speech recognition neural network in conjunction with a language model neural network.

Input 802 can be a timeframe of audio (e.g., a vocal command, segment of uttered speech, etc.). Such an input can be a fixed dimension vector comprised of extracted feature vectors. This fixed dimension vector can be fed into BLSTM 804. BLSTM 804 can be an encoder comprised of multiple BLSTM layers (e.g., five layers). BLSTM can process input 802 to output hidden vector representations 806.

Attention unit 808 can receive hidden vector representations 806. The attention unit can aligns the neural network in such a way that given a sequence of audio, the network can identify where a unit (e.g., character or byte-pair) starts and ends. Upon determining where units begin/end, the attention unit can determine a context vector 810. Context vector 810 can be input into BLSTM 812. BLSTM 812 can be a decoder comprised of multiple BLSTM layers (e.g., two layers). BLSTM 812 can output a unit 814 (e.g., character unit or byte-pair unit). Such a unit can be a dimension unit normalized using a softmax function.

Additional layers 816 can be added to the automatic speech recognition neural network of the speech recognition system. Additional layers 816 can include attention unit 818 and BLSTM 822. BLSTM 822 can be a decoder comprised of multiple BLSTM layers (e.g., two layers). Attention unit 818 can receive hidden vector representations 806. The attention unit can aligns the neural network in such a way that given a sequence of audio, the network can identify where a word unit starts and ends. Upon determining where word units begin/end, the attention unit 818 can determine a context vector 820. Context vector 820 can be input into BLSTM 822. BLSTM 822 can output a word unit 824. Such a unit can be a dimension unit normalized using a softmax function.

During iterations in which the speech recognition system is undergoing training or adaptation, loss in the network can be determined by comparing unit 814 with a ground truth unit and word unit 814 with a ground truth word unit. Iterations of training can be repeated for a sufficiently large number of training cycles, until the neural networks of the system converge to a desired state (e.g., where errors fall below a predetermined threshold such that the output produced reaches a desired threshold minimum of loss between output and ground truth output). Upon reaching a desired threshold minimum of loss, additional layers 816 can be removed from the speech recognition system.

When additional layers 816 have been removed, in further iterations, unit 814 can be input into language model 826 for decoding. In particular, language model 826 can interpret the units into recognizable words. Output 828 can be the recognized words from language model 826. Output 828 can be applied in any number of functions. For instance, in conversational image editing.

Figure 9:
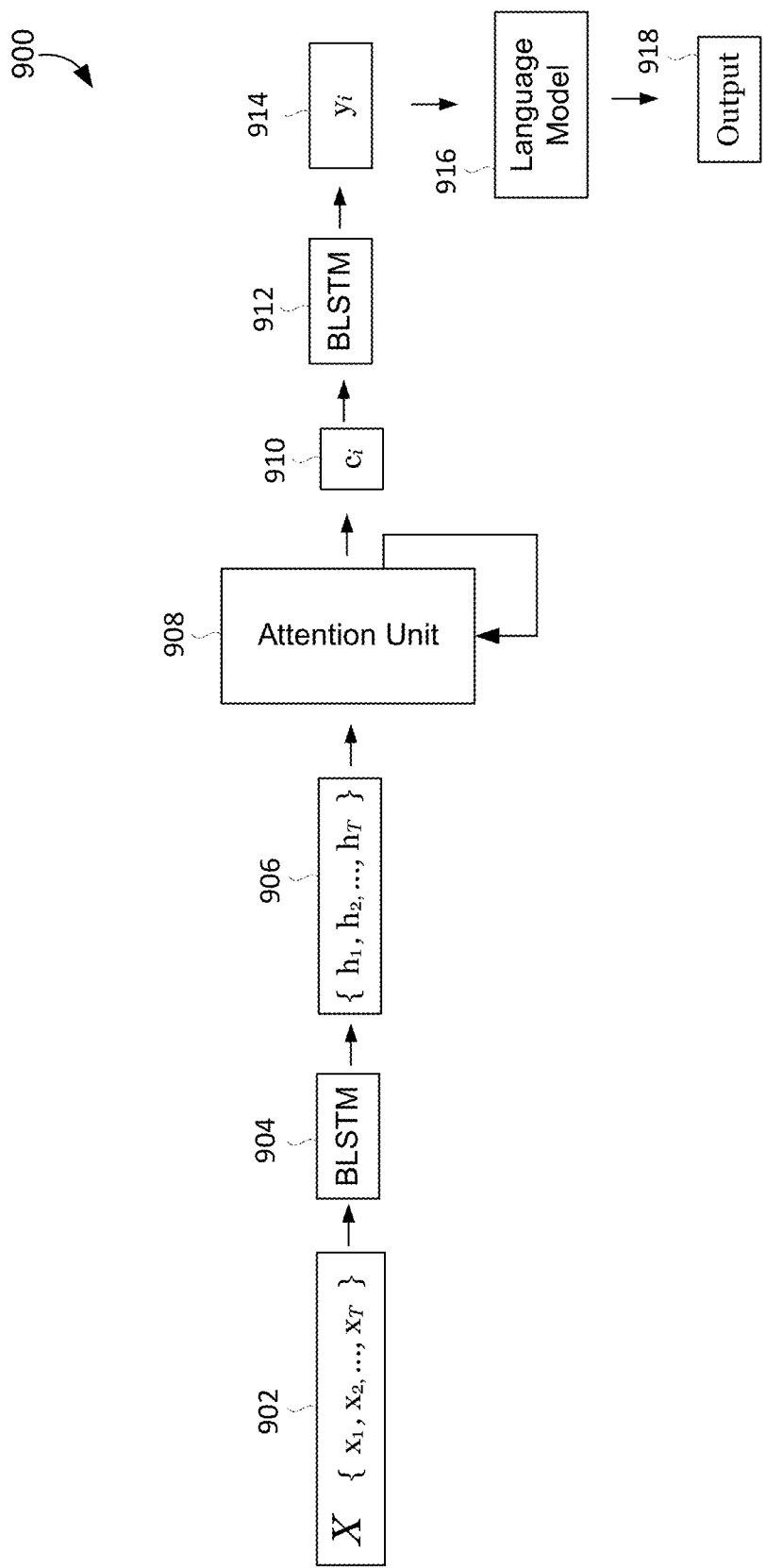
FIG. 9 illustrates an example environment that can be used for training and/or implementing a speech recognition system to recognize uttered speech, in accordance with embodiments of the present disclosure.

FIG. 9 illustrates an example environment 900 that can be used for training and/or implementing a speech recognition system to recognize uttered speech (e.g., vocal commands), in accordance with embodiments of the present disclosure. As depicted, the speech recognition system can be implemented using an automatic speech recognition neural network in conjunction with a language model neural network.

Input 902 can be a timeframe of audio (e.g., a vocal command, segment of uttered speech, etc.). Such an input can be a fixed dimension vector comprised of extracted feature vectors. This fixed dimension vector can be fed into BLSTM 904. BLSTM 904 can be an encoder comprised of multiple BLSTM layers (e.g., five layers). BLSTM can process input 902 to output hidden vector representations 906. Attention unit 908 can receive hidden vector representations 906. Attention unit 908 can also determine a context vector 910 using hidden vector representations 906.

Attention unit 906 can be adapted to align attention weights with output units. Aligning attention weights prevents erroneous attention weights from being included in context vector 910. To align attention weights, the alignment element can be used to apply a loss function to the attention unit. Sequence of features that correspond to a particular output can be compared with the actual sequence of features that should correspond to the output (e.g., ground truth). This comparison can be used to determine error in the attention unit. Attention unit 908 can then be updated for this error.

Context vector 910 can be input into BLSTM 912. BLSTM 912 can be a decoder comprised of multiple BLSTM layers (e.g., two layers). BLSTM 912 can output a unit 914 (e.g., character unit or byte-pair unit). Such a unit can be a dimension unit normalized using a softmax function. Unit 914 can be input into language model 916 for decoding. In particular, language model 916 can interpret the units into recognizable words. Output 918 can be the recognized words from language model 916. Output 918 can be applied in any number of functions. For instance, in conversational image editing.

During iterations in which the speech recognition system is undergoing training or adaptation, loss in the network can be determined by comparing unit 914 with a ground truth unit and/or comparing output 918 with a ground truth. Iterations of training can be repeated for a sufficiently large number of training cycles, until the neural networks of the system converge to a desired state (e.g., where errors fall below a predetermined threshold such that the output produced reaches a desired threshold minimum of loss between output and ground truth output).

Figure 10:
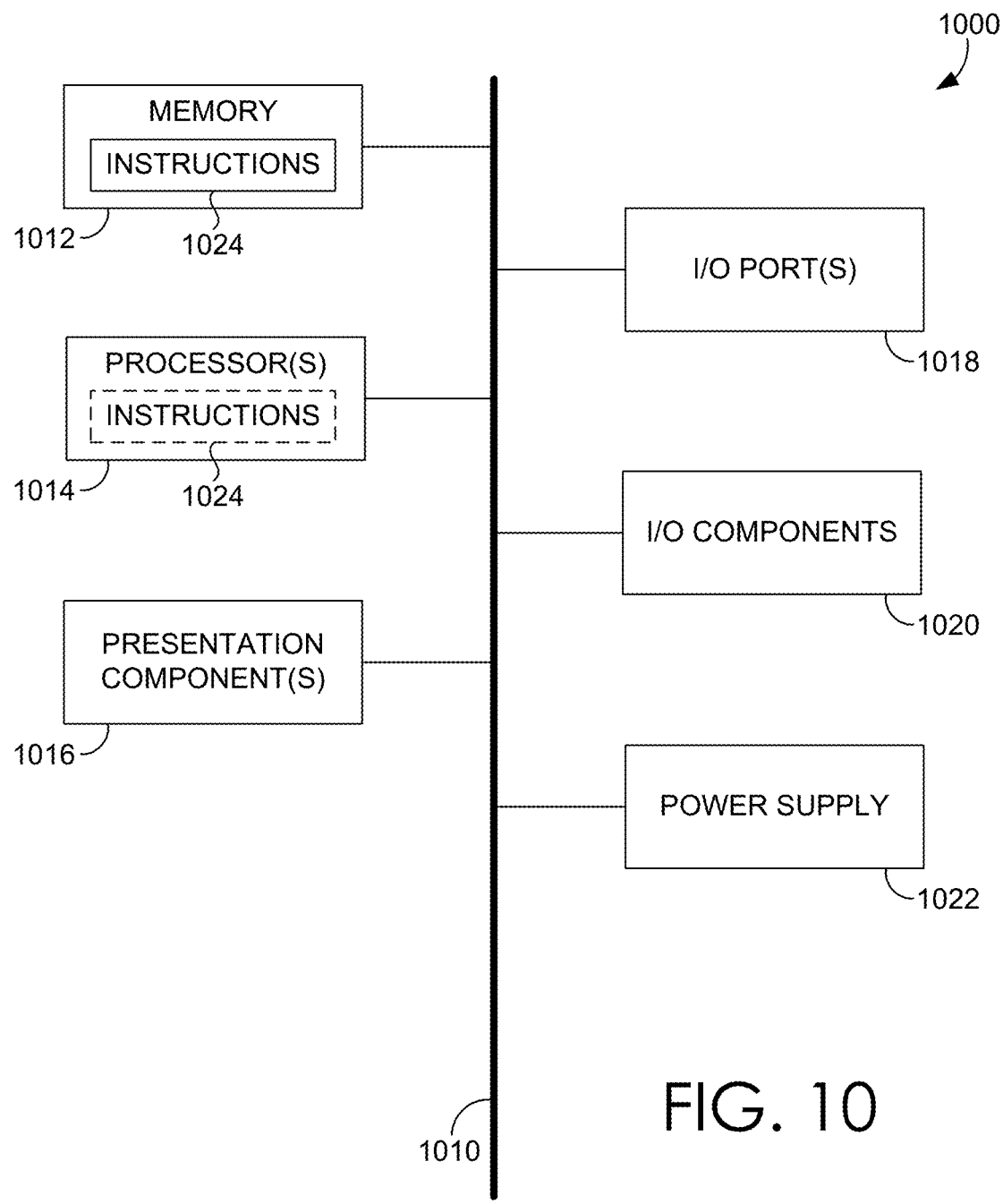
FIG. 10 is a block diagram of an example computing device in which embodiments of the present disclosure may be employed.

With reference to FIG. 10, computing device 1000 includes bus 1010 that directly or indirectly couples the following devices: memory 1012, one or more processors 1014, one or more presentation components 1016, input/output (I/O) ports 1018, input/output components 1020, and illustrative power supply 1022. Bus 1010 represents what may be one or more busses (such as an address bus, data bus, or combination thereof). Although the various blocks of FIG. 10 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. The inventors recognize that such is the nature of the art and reiterate that the diagram of FIG. 10 is merely illustrative of an exemplary computing device that can be used in connection with one or more embodiments of the present disclosure. Distinction is not made between such categories as "workstation," "server," "laptop," "handheld device," etc., as all are contemplated within the scope of FIG. 10 and reference to "computing device."

Computing device 1000 typically includes a variety of computer-readable media. Computer-readable media can be any available media that can be accessed by computing device 1000 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 1000. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 1012 includes computer storage media in the form of volatile and/or nonvolatile memory. As depicted, memory 1012 includes instructions 1024. Instructions 1024, when executed by processor(s) 1014 are configured to cause the computing device to perform any of the operations described herein, in reference to the above discussed figures, or to implement any program modules described herein. The memory may be removable, non-removable, or a combination thereof. Exemplary hardware devices include solid-state memory, hard drives, optical-disc drives, etc. Computing device 1000 includes one or more processors that read data from various entities such as memory 1012 or I/O components 1020. Presentation component(s) 1016 present data indications to a user or other device. Exemplary presentation components include a display device, speaker, printing component, vibrating component, etc.

I/O ports 1018 allow computing device 1000 to be logically coupled to other devices including I/O components 1020, some of which may be built in. Illustrative components include a microphone, joystick, game pad, satellite dish, scanner, printer, wireless device, etc. I/O components 1020 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on computing device 1000. Computing device 1000 may be equipped with depth cameras, such as stereoscopic camera systems, infrared camera systems, RGB camera systems, and combinations of these, for gesture detection and recognition. Additionally, computing device 1000 may be equipped with accelerometers or gyroscopes that enable detection of motion. The output of the accelerometers or gyroscopes may be provided to the display of computing device 1000 to render immersive augmented reality or virtual reality.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. One or more non-transitory computer-readable media having a plurality of executable instructions embodied thereon, which, when executed by one or more processors, cause the one or more processors to perform a method, the method comprising:
   obtaining an utterance related to a target domain, the utterance represented as a dimension vector;
   generating, using an automatic speech recognition neural network, a context vector based on the dimension vector, the context vector indicating a predicted character related to the utterance, wherein the automatic speech recognition neural network is configured to generate character units for input utterances related to the target domain by maintaining parameters of a layer of the automatic speech recognition neural network associated with a generic domain during adaptation of the automatic speech recognition neural network, wherein one or more outputs from the automatic speech recognition neural network reach a threshold level of accuracy for the target domain; and
   generating, using the automatic speech recognition neural network, a character unit from the context vector that represents the predicted character.

2. The media of claim 1, the method further comprising: determining a transcript for the utterance using a language model neural network configured to predict words based on previous words in the utterance.

3. The media of claim 2, the method further comprising: applying an action based on the transcript, wherein the action is performed in relation to a software application.

4. The media of claim 3, wherein performing the action includes applying a feature of the application related to the utterance.

5. The media of claim 1, wherein the layer is a decoder, the decoder being frozen during adaptation to maintain the parameters of the decoder while parameters of unfrozen layers of the automatic speech recognition neural network are updated based on error.

6. The media of claim 1, wherein the utterance relates to a timeframe of audio.

7. The media of claim 1, the method further comprising:
   receiving audio; and
   processing the audio, wherein processing extracts feature vectors of the audio to generate the dimension vector that represents the utterance.

8. A computer-implemented method comprising:
   training an automatic speech recognition neural network using a generic dataset to output characters, wherein the training includes:
      receiving a training utterance related to the generic domain,
      generating a training hidden representations based on the training utterance,
      using the training hidden representations to generate a training context vector that indicates a training predicted character related to the training utterance,
      generating the training predicted character,
      determining training error in the automatic speech recognition neural network based on the training predicted character and
      initially training the automatic speech recognition neural network by updating the automatic speech recognition neural network based on the training error;
   training a language model neural network using the generic dataset;
   freezing one or more encoder layers of the automatic speech recognition neural network;
   adapting the automatic speech recognition neural network for a target dataset by maintaining weights for the one or more frozen encoder layers and updating weights of one or more unfrozen decoder layers based on the target dataset;
   adapting the language model neural network to the target dataset; and
   outputting a customized speech recognition neural network system comprised of the adapted automatic speech recognition neural network and the adapted language model neural network.

9. The computer-implemented method of claim 8, wherein adapting the automatic speech recognition neural network for a target dataset further comprises updating weights for an attention unit.

10. The computer-implemented method of claim 9, wherein
   the training utterance is represented as a training fixed dimension vector.

11. The computer-implemented method of claim 9, wherein adapting the automatic speech recognition neural network further comprises:
   receiving an adaptation utterance related to a target domain, the adaptation utterance represented as a fixed dimension vector;
   generating hidden representations based on the fixed dimension vector;
   using the hidden representations to generate an adaptation context vector that indicates a predicted character related to the adaptation utterance;
   generating the predicted character;

determining adaptation error in the automatic speech recognition neural network based on the predicted character; and adapting the automatic speech recognition neural network by updating the automatic speech recognition neural network based on the adaptation error.

12. The computer-implemented method of claim 11, wherein the training error is determined using cross entropy loss.

13. The computer-implemented method of claim 9, wherein the language model neural network is a word language model.

14. The computer-implemented method of claim 9, wherein the language model neural network is a character language model.

15. The computer-implemented method of claim 9, further comprising:

utilizing the customized speech recognition neural network system comprised of the adapted automatic speech recognition neural network and the adapted language model neural network to understand input vocal commands.

16. The computer-implemented method of claim 8, further comprising:

applying the customized speech recognition neural network system within an application, wherein the application is related to the target domain.

17. The computer-implemented method of claim 16, wherein the application responds to the input vocal commands.

18. A computing system comprising:

means for obtaining an utterance related to a target domain, the utterance represented as a dimension vector;

means for generating, using an automatic speech recognition neural network, a context vector based on the dimension vector, the context vector indicating a predicted character related to the utterance, wherein the automatic speech recognition neural network is configured to generate character units for input utterances related to the target domain by maintaining parameters of a layer of the automatic speech recognition neural network associated with a generic domain during adaptation of the automatic speech recognition neural network, wherein one or more outputs from the automatic speech recognition neural network reach a threshold level of accuracy for the target domain; and means for generating, using the automatic speech recognition neural network, a character unit from the context vector that represents the predicted character.

19. The system of claim 18, further comprising:

means for training a language model neural network in the generic domain to output words.

20. The system of claim 19, further comprising:

means for utilizing a customized speech recognition neural network system, the customized speech recognition neural network system comprising the automatic speech recognition neural network.

* * * * *